(12) United States Patent
Kao et al.

(10) Patent No.: US 11,900,610 B2
(45) Date of Patent: Feb. 13, 2024

(54) IMAGE PROCESSING APPARATUS AND METHOD

(71) Applicant: Samsung Electronics Co., Ltd., Suwon-si (KR)

(72) Inventors: Yueying Kao, Beijing (CN); Yang Liu, Beijing (CN); Hao Wang, Beijing (CN); Sunghoon Hong, Suwon-si (KR); Wooshik Kim, Suwon-si (KR); Chao Zhang, Beijing (CN); Lin Ma, Beijing (CN); Qiang Wang, Beijing (CN); Weiming Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/126,042

(22) Filed: Mar. 24, 2023

(65) Prior Publication Data
US 2023/0230251 A1    Jul. 20, 2023

Related U.S. Application Data

(62) Division of application No. 17/095,784, filed on Nov. 12, 2020, now Pat. No. 11,645,756.

(30) Foreign Application Priority Data

Nov. 14, 2019   (CN) .......................... 201911115151.0
Aug. 26, 2020   (KR) ........................ 10-2020-0108091

(51) Int. Cl.
*G06T 7/11*      (2017.01)
*G06T 7/149*     (2017.01)
(Continued)

(52) U.S. Cl.
CPC ............... *G06T 7/11* (2017.01); *G06T 7/149* (2017.01); *G06T 7/168* (2017.01); *G06T 15/00* (2013.01);
(Continued)

(58) Field of Classification Search
CPC . G06T 7/11; G06T 7/168; G06T 7/149; G06T 15/00; G06T 2200/04;
(Continued)

(56) References Cited

U.S. PATENT DOCUMENTS 7,003,136 B1   2/2006   Harville
7,831,087 B2   11/2010  Harville
(Continued)

FOREIGN PATENT DOCUMENTS

EP       1 763 845 B1       10/2013
KR    10-2016-0001699 A      1/2016
(Continued)

OTHER PUBLICATIONS

Yuan et al., 2012, "Movement and deformation of virtual object based on argument passing method" (pp. 1-4). (Year: 2012).*
(Continued)

*Primary Examiner* — Manav Seth
(74) *Attorney, Agent, or Firm* — NSIP Law

(57) ABSTRACT

An image processing apparatus and method are provided. The image processing apparatus acquires a target image including a depth image of a scene, determines three-dimensional (3D) point cloud data corresponding to the depth image based on the depth image, and extracts an object included in the scene to acquire an object extraction result based on the 3D point cloud data.

5 Claims, 21 Drawing Sheets

(51) Int. Cl.

| | |
|---|---|
| G06T 15/00 | (2011.01) |
| G06T 7/168 | (2017.01) |
| G06V 10/25 | (2022.01) |
| G06V 10/764 | (2022.01) |
| G06V 10/44 | (2022.01) |
| G06V 20/64 | (2022.01) |

(52) U.S. Cl.
CPC ............ *G06V 10/25* (2022.01); *G06V 10/454* (2022.01); *G06V 10/764* (2022.01); *G06V 20/64* (2022.01); *G06T 2200/04* (2013.01); *G06T 2200/08* (2013.01); *G06T 2207/10016* (2013.01); *G06T 2207/10024* (2013.01); *G06T 2207/10028* (2013.01); *G06T 2207/20108* (2013.01); *G06T 2215/08* (2013.01)

(58) Field of Classification Search
CPC ....... G06T 2200/08; G06T 2207/10016; G06T 2207/10024; G06T 2207/10028; G06T 2207/20108; G06T 2215/08; G06V 10/25; G06V 10/454; G06V 20/64; G06V 10/764
See application file for complete search history.

(56) References Cited

U.S. PATENT DOCUMENTS

| | | | |
|---|---|---|---|
| 8,886,387 B1 | 11/2014 | Agarwal et al. | |
| 8,886,501 B2* | 11/2014 | Muller-Fischer | G06T 17/00 703/2 |
| 9,111,444 B2 | 8/2015 | Kaganovich | |
| 9,159,134 B2 | 10/2015 | Martinetz et al. | |
| 9,189,855 B2 | 11/2015 | Guigues et al. | |
| 9,196,067 B1 | 11/2015 | Freed et al. | |
| 9,235,928 B2 | 1/2016 | Medioni et al. | |
| 9,330,478 B2* | 5/2016 | Anderson | G06T 19/006 |
| 9,332,243 B2 | 5/2016 | Klusza et al. | |
| 9,384,594 B2 | 7/2016 | Maciocci et al. | |
| 9,418,475 B2 | 8/2016 | Medioni et al. | |
| 9,547,901 B2 | 1/2017 | Wang et al. | |
| 9,552,673 B2* | 1/2017 | Hilliges | G06F 3/011 |
| 9,600,933 B2 | 3/2017 | Wu et al. | |
| 9,619,691 B2 | 4/2017 | Pang et al. | |
| 9,649,767 B2 | 5/2017 | Nusser et al. | |
| 9,799,146 B2* | 10/2017 | Pinskiy | G06T 19/20 |
| 9,836,871 B2 | 12/2017 | Chon | |
| 9,858,683 B2 | 1/2018 | Liu et al. | |
| 10,042,188 B2* | 8/2018 | Choukroun | G06T 7/70 |
| 10,115,035 B2 | 10/2018 | Lee et al. | |
| 10,354,397 B2* | 7/2019 | Davis | G06T 7/251 |
| 10,373,380 B2 | 8/2019 | Kutliroff et al. | |
| 10,416,669 B2* | 9/2019 | Rico | B64C 39/024 |
| 10,417,777 B2* | 9/2019 | Miyasa | G06T 7/33 |
| 10,475,232 B2 | 11/2019 | Chon | |
| 10,539,676 B2 | 1/2020 | Li et al. | |
| 10,573,081 B2* | 2/2020 | Tomizuka | H04L 67/131 |
| 10,628,996 B2* | 4/2020 | Kass | G06T 19/006 |
| 10,636,219 B2* | 4/2020 | Steinbrücker | G06V 20/10 |
| 10,724,848 B2 | 7/2020 | Cao et al. | |
| 10,973,581 B2 | 4/2021 | Mariampillai et al. | |
| 11,200,685 B2 | 12/2021 | Kong et al. | |
| 11,227,446 B2* | 1/2022 | Malia | G06F 3/04815 |
| 11,393,127 B2 | 7/2022 | Parkison et al. | |
| 11,727,647 B2* | 8/2023 | Rolion | G06T 19/20 345/633 |
| 2004/0233223 A1* | 11/2004 | Schkolne | G06F 3/04845 348/E5.002 |
| 2011/0117530 A1* | 5/2011 | Albocher | G09B 23/285 703/11 |
| 2012/0038639 A1* | 2/2012 | Mora | G06T 19/20 345/420 |
| 2013/0120365 A1* | 5/2013 | Lee | G06F 3/011 345/419 |
| 2014/0355869 A1 | 12/2014 | Gershenson et al. | |
| 2015/0253428 A1* | 9/2015 | Holz | G01S 7/483 356/5.01 |
| 2015/0288947 A1 | 10/2015 | Ahrns et al. | |
| 2017/0199580 A1* | 7/2017 | Hilliges | G06T 15/08 |
| 2019/0318548 A1* | 10/2019 | Kim | G06T 17/20 |
| 2020/0073483 A1* | 3/2020 | Berenzweig | G06N 3/084 |
| 2021/0056685 A1 | 2/2021 | Zhang et al. | |
| 2022/0130118 A1* | 4/2022 | Malia | G06T 19/006 |
| 2022/0207897 A1 | 6/2022 | Zeng | |

FOREIGN PATENT DOCUMENTS

| | | |
|---|---|---|
| KR | 10-2016-0034513 A | 3/2016 |
| KR | 10-2018-0020725 A | 2/2018 |
| KR | 10-2019-0034129 A | 4/2019 |
| KR | 10-2019-0062102 A | 6/2019 |

OTHER PUBLICATIONS

Kang et al., 1996, "Deforming virtual objects interactively in accordance with an elastic model" (pp. 251-262). (Year: 1996).*

Xiang, Yu, et al., "Beyond PASCAL: A Benchmark for 3D Object Detection in the Wild," Proceedings of the 2014 *IEEE Winter Conference on Applications of Computer Vision (WACV 2014)*, 2014, pp. 75-82, doi: 10.1109/WACV.2014.6836101, conference held Mar. 24-26, 2014, Steamboat Springs, Colorado.

Aubry, Mathieu, et al., "Seeing 3D chairs: exemplar part-based 2D-3D alignment using a large dataset of CAD models," *Proceedings of the 2014 IEEE Conference on Computer Vision and Pattern Recognition (CVPR 2014)*, 2014, pp. 3762-3769, doi: 10.1109/CVPR.2014.4872014, conference held Jun. 23-28, 2014, Columbus, Ohio.

Su, Hao, et al., "Render for CNN: Viewpoint Estimation in Images Using CNNs Trained with Rendered 3D Model Views," *Proceedings of the 2015 IEEE International Conference on Computer Vision (ICCV 2015)*, 2015, pp. 2686-2694, doi: 10.1109/ICCV.2015.308, conference held Dec. 11-18, 2015, Santiago, Chile.

Understanding ARKit Tracking and Detection, 57:59 long video recorded at 2018 Apple Worldwide Developers Conference (WWDC 2018), Jun. 4-8, 2018, San Jose, California, video available at https://developer.apple.com/videos/play/wwdc2018/610, printout of webpage for video dated Nov. 11, 2020, pp. 1-2.

Qi, Charles R., et al., "Frustum PointNets for 3D Object Detection from RGB-D Data," *Proceedings of the 2018 IEEE/CVF Conference on Computer Vision and Pattern Recognition (CVPR 2018)*, 2018, pp. 918-927, doi: 10.1109/CVPR.2018.00102, conference held Jun. 18-23, 2018, Salt Lake City, Utah.

Grabner, Alexander, et al., "3D Pose Estimation and 3D Model Retrieval for Objects in the Wild—Supplementary Material," *Proceedings of the 2018 IEEE/CVF Conference on Computer Vision and Pattern Recognition (CVPR 2018)*, 2018, pp. 3022-3031 (only Supplementary Material cited), doi: 10.1109/CVPR.2018.00319, conference held Jun. 18-23, 2018, Salt Lake City, Utah.

Kao, Yueying, et al., "An Appearance-and-Structure Fusion Network for Object Viewpoint Estimation," *Proceedings of the Twenty-Seventh International Joint Conference on Artificial Intelligence (IJCAI-18)*, 2018, pp. 4929-4935, doi: 10.24963/ijcai.2018/684, conference held Jul. 13-19, 2018, Stockholm, Sweden.

Yuan, Wentao, et al., "PCN: Point Completion Network," *Proceedings of the 2018 International Conference on 3D Vision (3DV 2018)*, 2018, pp. 728-737, doi: 10.1109/3DV.2018.00088, conference held Sep. 5-8, 2018, Verona, Italy.

Wang, Chen, et al., "DenseFusion: 6D Object Pose Estimation by Iterative Dense Fusion," *Proceedings of the 2019 IEEE/CVF Conference on Computer Vision and Pattern Recognition (CVPR 2019)*, 2019, pp. 3338-3347, doi: 10.1109/CVPR.2019.00346, conference held Jun. 15-20, 2019, Long Beach, California (copy submitted is the Open Access version provided the Computer Vision Foundation with pages numbered 3343-3352).

Hou, Ji, et al., "3D-SIS: 3D Semantic Instance Segmentation of RGB-D Scans," *Proceedings of the 2019 IEEE/CVF Conference on Computer Vision and Pattern Recognition (CVPR 2019)* 2019, pp. 4416-4425, doi: 10.1109/CVPR.2019.00455, conference held Jun.

(56) References Cited

OTHER PUBLICATIONS 15-20, 2019, Long Beach, California (copy submitted is the Open Access version provided the Computer Vision Foundation with pages numbered 4421-4430).
U.S. Appl. No. 17/095,784, filed Nov. 12, 2020, Yueying Kao et al., Samsung Electronics Co., Ltd.

* cited by examiner

Anchor prediction at A

Anchor prediction at B

IMAGE PROCESSING APPARATUS AND METHOD

CROSS-REFERENCE TO RELATED APPLICATIONS

This application is a division of application Ser. No. 17/095,784 filed on Nov. 12, 2020, and claims the benefit under 35 USC 119(a) of Chinese Patent Application No. 201911115151.0 filed on Nov. 14, 2019, in the State Intellectual Property Office of China, and Korean Patent Application No. 10-2020-0108091 filed on Aug. 26, 2020, in the Korean Intellectual Property Office, the entire disclosures of which are incorporated herein by reference for all purposes.

BACKGROUND

1. Field

The following description relates to an image processing apparatus and method.

2. Description of Related Art

An area including an object in the image may be extracted based on three-dimensional (3D) voxels of a depth image. However, such a scheme of obtaining the extraction result of the object based on 3D voxels requires a large amount of storage space and computing resources, which causes the algorithm to be inefficient.

The following schemes may be used to extract an area of an object from an image.

A first scheme is a scheme of obtaining an extraction result of an object based on a two-dimensional (2D) image feature of an image. In the first scheme, a bounding box of an object in a color image may be determined based on an object detection result of the color image, a cone may be obtained by cutting depth point cloud data, and 3D object segmentation and a 3D bounding box and pose estimation may be performed based on a cut point cloud.

A second scheme is a scheme of extracting a 2D bounding box and an image area of an object from a color image based on a trained model. The model is trained based on a 2D bounding box and an image area of an object in a sample image. The second scheme may be used to determine a 2D bounding box and an image area of a 2D image to obtain a 3D voxel corresponding to an object based on a feature of the color image and a feature of a depth image, and to obtain a pose estimation result of the object based on the 3D voxel.

A third scheme is a scheme of estimating a pose of an object in a single image based on structure information and an appearance image feature of the object.

A fourth scheme may be used to align a 3D model of an object and an object of an image to retrieve a 3D model matching a shape style of the object of the image based on the shape style, and to estimate a viewing angle of the 3D model with respect to a camera.

An extraction result of an object, for example, a pose, a 2D bounding box or an image area of the object, may be acquired through the above-described schemes, however, the schemes have issues described below.

The first scheme is suitable for only extraction of an object from a color image, and an extraction result of the object is inaccurate due to omission of 3D features of the object.

The second scheme is suitable for only extraction of an object from a color image, and is unsuitable for extraction of an object from a depth image. A scheme of acquiring an extraction result of an object based on a 3D voxel requires a large amount of storage space and computing resources, which causes the algorithm to be inefficient.

The third scheme is suitable for only extraction of an object from a color image, and is unsuitable for extraction of an object from a depth image.

The fourth scheme is a scheme of determining an extraction result of an object based on a structural feature of the object. However, since the structural feature of the object does not reflect detailed features of the object, extraction of the object is not correct.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method including acquiring a target image including a depth image of a scene, determining three-dimensional (3D) point cloud data corresponding to the depth image based on the depth image, and extracting an object included in the scene to acquire an object extraction result based on the 3D point cloud data.

The acquiring of the object extraction result based on the 3D point cloud data may include converting the 3D point cloud data into a matrix, determining a first feature map based on the matrix, and acquiring the object extraction result based on the first feature map.

The converting of the 3D point cloud data into the matrix may include determining point cloud data belonging to an object in the 3D point cloud data, and determining the matrix corresponding to the 3D point cloud data based on the point cloud data belonging to the object in the 3D point cloud data.

The target image may include a color image of the scene, the image processing method may include acquiring a second feature map by extracting a feature from the color image, and the acquiring of the object extraction result based on the first feature map may include acquiring the object extraction result based on the first feature map and the second feature map.

The acquiring of the object extraction result based on the first feature map and the second feature map may include acquiring a third feature map corresponding to the target image by fusing the first feature map and the second feature map, and acquiring the object extraction result based on the third feature map.

The acquiring of the object extraction result based on the third feature map may include acquiring at least two sub-images by segmenting the target image, determining extraction results of objects for each of the sub-images based on any one or any combination of a third feature map corresponding to each of the sub-images and a third feature map corresponding to a sub-image adjacent to each of the sub-images, and acquiring the object extraction result by fusing the determined extraction results.

The determining of the extraction results of the objects for each of the sub-images may include determining a weight of each of the sub-images, and determining the extraction results based on the third feature map corresponding to any one or any combination of each of the sub-images and the third feature map corresponding to the sub-image adjacent to each of the sub-images, and the weight of each of the sub-images.

The determining of the weight of each of the sub-images may include one of determining the weight of each of the sub-images based on a sub-feature map corresponding to each of the sub-images, and determining a candidate point of the target image, and determining the weight of each of the sub-images based on a candidate point of each of the sub-images or a sub-feature map corresponding to the candidate point of each of the sub-images.

The determining of the weight of each of the sub-images based on the candidate point of each of the sub-images may include determining a similarity relationship between the candidate point of each of the sub-images and a candidate point of a sub-image adjacent to each of the sub-images, and determining the weight of each of the sub-images based on the similarity relationship.

The determining of the weight of each of the sub-images based on the sub-feature map corresponding to each of the sub-images may include one of determining a first feature vector corresponding to a central position of each of the sub-images and a second feature vector corresponding to the sub-feature map corresponding to each of the sub-images, and determining the weight of each of the sub-images based on the first feature vector and the second feature vector corresponding to each of the sub-images, and determining a maximum probability value from among probability values corresponding to at least one object, the sub-feature map corresponding to at least one probability value, and each probability value representing a probability of the sub-feature map belonging to a corresponding object.

The image processing method may include determining a 3D detection result of an object included in the target image based on the object extraction result, wherein the 3D detection result may include either one or both of a 3D pose result and a 3D segmentation result.

The determining of the 3D detection result of the object included in the target image based on the object extraction result may include extracting a two-dimensional (2D) image feature and a 3D point cloud feature corresponding to the object extraction result, acquiring a fourth feature map by splicing the 2D image feature and the 3D point cloud feature, and determining the 3D detection result of the object included in the target image based on the fourth feature map.

The determining of the 3D detection result of the object included in the target image based on the object extraction result may include determining an initial 3D detection result of the object included in the target image based on the object extraction result, determining an original image corresponding to the object included in the target image, determining difference information corresponding to an initial 3D detection result of each object based on the initial 3D detection result of each object and a corresponding original image, and determining a 3D detection result of each object included in the target image by updating an initial 3D detection result of a corresponding object based on the difference information.

In another general aspect, there is provided an image processing method including acquiring deformation information of a virtual object with respect to a real object included in a target image, and acquiring the deformed target image by deforming the real object based on the deformation information.

The acquiring of the deformed target image by deforming the real object based on the deformation information may include determining an original image corresponding to the real object, determining a transformation relationship between an undeformed image and a deformed image based on a three-dimensional (3D) pose result corresponding to the real object, the deformation information, and the original image corresponding to the real object, the undeformed image, and the deformed image corresponding to the real object, determining the deformed image based on the transformation relationship and the undeformed image, and determining the deformed target image based on the deformed image, wherein the undeformed image is an image corresponding to the real object included in the target image.

The determining of the transformation relationship between the undeformed image and the deformed image based on the 3D pose result corresponding to the real object, the deformation information, and the original image corresponding to the real object may include determining a deformation point after deformation corresponding to the real object in the original image based on the original image corresponding to the real object, the deformation information and a corresponding relationship, and determining the transformation relationship between the undeformed image and the deformed image corresponding to the real object based on the deformation point after deformation corresponding to the real object, a deformation point before deformation corresponding to the real object, and the 3D pose result corresponding to the real object, and the corresponding relationship is established based on deformation points corresponding to an object before and after deformation under different pieces of deformation information in a sample image.

The determining of the transformation relationship between the undeformed image and the deformed image corresponding to the real object based on the deformation point after deformation corresponding to the real object, the deformation point before deformation corresponding to the real object, and the 3D pose result corresponding to the real object may include determining a weight of each deformation point corresponding to the real object, and determining the transformation relationship between the undeformed image and the deformed image corresponding to the real object based on the weight of each deformation point, the deformation point after deformation corresponding to the real object, the deformation point before deformation corresponding to the real object, and the 3D pose result corresponding to the real object.

The determining of the deformed target image based on the deformed image corresponding to the real object may include either one or both of (1) acquiring the deformed target image by replacing the undeformed image with the deformed image, and (2) determining a differential image based on the undeformed image and the deformed image, and determining the deformed target image based on the differential image.

In another general aspect, there is provided an image processing apparatus including an image acquisition module configured to acquire a target image including a depth image of a scene, a three-dimensional (3D) point cloud data determination module configured to determine 3D point cloud data corresponding to the depth image based on the depth image, and a 3D detection result determination module configured to extract an object included in the scene to acquire an object extraction result based on the 3D point cloud data.

The image processing apparatus may include a deformation information acquisition module configured to acquire deformation information of a virtual object with respect to a real object included in the target image, and an image deformation module configured to acquire the deformed target image by deforming the real object based on the deformation information.

Other features and aspects will be apparent from the following detailed description, the drawings, and the claims.

Figure 1:
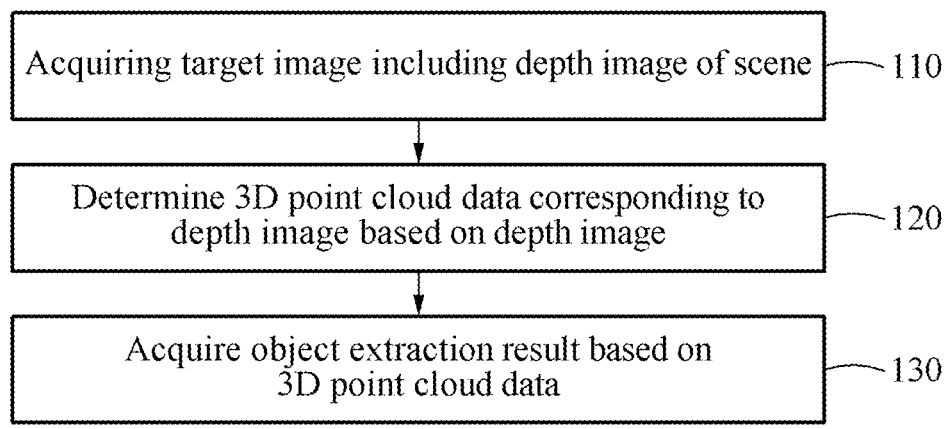
FIG. 1 is a diagram illustrating an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It would be understood by one of ordinary skill in the art that the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items. Also, the term "connection" or "coupling" used herein may include wireless connection or wireless coupling.

The use of the term "may" herein with respect to an example or embodiment (e.g., as to what an example or embodiment may include or implement) means that at least one example or embodiment exists where such a feature is included or implemented, while all examples are not limited thereto.

In order to better understand and describe methods according to the examples, some technical terms mentioned in the present disclosure will be briefly described below.

The term "voxel" used herein is an abbreviation of a volume element, is the smallest digital data unit in three-dimensional (3D) space division, and is similar to a pixel that is the smallest unit in two-dimensional (2D) space.

The term "3D geometric feature" used herein is a geometric expression of a 3D element. Here, an element may be, for example, a point cloud, a mesh, a point of the point cloud, or a vertex or a face of the mesh.

The term "3D point cloud data" used herein is a point set including a plurality of 3D discrete points. 3D point cloud data may include a 3D geometric feature of an object.

The term "depth image" used herein includes an image channel or an image of information associated with a distance to a surface of an object in a scene at a viewpoint. A grayscale value of each pixel in the depth image may be used to represent a distance between a camera and a predetermined point in a scene.

The term "feature map" used herein is a feature map obtained by a convolution of a filter and an image. The feature map may be combined with the filter to generate a new feature map through the convolution.

The term "neural network (NN)" used herein is an algorithmic mathematical model that has an ability to solve a problem, the algorithm includes artificial neurons (nodes) that forms a network through synaptic combinations and changes a connection strength of the synapses through training. Such a network may depend on complexity of a system, and may adjust an interconnection between a large number of nodes in the network to achieve the purpose of information processing.

The term "multilayer perceptron (MLP)" used herein is referred to as an "artificial neural network (ANN)", and may include a plurality of hidden layers between an input layer and an output layer in addition to the input layer and the output layer.

The term "computer aided design (CAD)" used herein may be an interactive drawing system that helps designers perform design tasks using computers and graphic equipment.

In an example, an image (hereinafter, referred to as a "target image") to be processed may be acquired, 3D point cloud data corresponding to a depth image in the target image may be determined, and an object extraction result may be acquired based on the 3D point cloud data. The object extraction result may be a result obtained by extracting an object included in a scene. The 3D point cloud data may be a point set including a plurality of 3D discrete points, and a quantity of the 3D point cloud data may be less than a quantity of data corresponding to 3D voxels. Thus, by acquiring the object extraction result based on the 3D point cloud data, it is possible to save a storage space to reduce a data workload, and to enhance a work efficiency of an algorithm. Also, the 3D point cloud data may describe a 3D structure feature of an object, and the object extraction result based on the 3D point cloud data may be more exact. An MLP encoder may be used to extract a feature of 3D point cloud data, and may convert the 3D point cloud data into a matrix to further reduce a data throughput and enhance an efficiency of an algorithm.

Hereinafter, it will be described in detail how to solve the above-described technical problem by the above-described technical solution of the present disclosure through examples. The following examples may be combined, and the same or similar concept or processes may not be described again in some of examples. Hereinafter, the examples will be described with reference to the accompanying drawings.

FIG. 1 is a diagram illustrating an example of an image processing method.

Referring to FIG. 1, the image processing method includes operations 110 through 130.

In operation 110, a target image is acquired. The target image includes a depth image of a scene.

The target image may be an image in which an extraction result of an object needs to be determined. The target image may be, for example, a depth image captured by a terminal device having a depth image capturing function, or a depth image obtained by performing processing based on a color image. An object included in a scene may include, but is not limited to, for example, a person or an animal. At least one object may be simultaneously included in the scene.

In operation 120, 3D point cloud data corresponding to the depth image is determined based on the depth image.

For example, one method of determining the 3D point cloud data corresponding to the depth image based on the depth image is to convert depth information and 2D image coordinates of the depth image from an image coordinate system to a world coordinate system. The 3D point cloud data may describe a 3D structural feature of an object, that is, a 3D geometric feature in a 3D space, and each 3D point converted from a depth image back projection into a 3D space may correspond to each pixel of an original depth image.

In operation 130, an object extraction result is acquired based on the 3D point cloud data. The object extraction result may be a result obtained by extracting an object included in the scene.

For example, the object extraction result may represent an area of the object in the target image. When the scene includes a plurality of objects, the object extraction result may represent an object area corresponding to each object included in the target image. The object extraction result may be an image with an object area identification, the object area identification may be a marker box, and an area selected by the marker box may be an object area.

In the image processing method according to the present disclosure, when the target image is acquired, the 3D point cloud data corresponding to the depth image of the scene in the target image may be determined based on the depth image. Also, based on the 3D point cloud data, the object extraction result for the object in the scene may be obtained. Since the 3D point cloud data represents a point set including a plurality of 3D discrete points, a quantity of the 3D point cloud data may be less than a quantity of data corresponding to a 3D voxel. Thus, by acquiring the object extraction result based on the 3D point cloud data, it is possible to save a storage space to reduce a data workload, and to enhance a work efficiency of an algorithm.

In operation 130, a matrix corresponding to the 3D point cloud data may be determined based on the 3D point cloud data, a first feature map may be determined based on the matrix, and the object extraction result may be determined based on the first feature map.

For example, when features for the 3D point cloud data are extracted, the 3D point cloud data may be converted into a matrix to reduce a data throughput. To extract the features for the 3D point cloud data, an MLP encoder may be used. The MLP encoder may be configured to convert data into a matrix and to perform a subsequent processing on the matrix to obtain a feature map corresponding to the data, when features of the data are extracted. For example, the 3D point cloud data may include "N" points, and a matrix corresponding to the 3D point cloud data may be represented as an "N×3" matrix.

In the image processing method according to the present disclosure, the MLP encoder may be used to extract features. The MLP encoder may be trained and obtained using a scheme described below.

First, sample images are obtained. Each of the sample images includes a depth image of a scene. A label result of each object appears in each of the sample images, and represents a 3D detection result of each object in each of the sample images.

Second, an initial network model is trained based on a depth image corresponding to each of the sample images until a loss function of the initial network model converges, and a model when the training is terminated is used as the MLP encoder. The loss function may represent a degree of difference between a label result and a prediction result of each of the sample images.

The 3D detection result may include a 3D object frame, a 3D key point, and a 3D object segmentation result, and may correspond to a corresponding prediction result. It may be understood that 3D detection results may be combined and used during training. Based on the 3D detection results, whether features extracted by the trained MLP encoder are correct may be determined.

In the image processing method according to the present disclosure, determining of the matrix corresponding to the 3D point cloud data based on the 3D point cloud data may include determining point cloud data belonging to an object in the 3D point cloud data, and determining the matrix corresponding to the 3D point cloud data based on the point cloud data belonging to the object in the 3D point cloud data.

Prior to extracting of features of the 3D point cloud data, the point cloud data belonging to the object in the 3D point cloud data may be determined first. Features may be extracted from the point cloud data belonging to the object in the 3D point cloud data, instead of from point cloud data that does not belong to the object, and thus the data throughput may be reduced. The point cloud data that does not belong to the object may be point cloud data corresponding to a background of an image.

In the image processing method, when the target image further includes a color image of the scene, the depth image may also be determined based on the color image.

When it is not easy to obtain a depth image in a portion of scenes, a depth image may be obtained based on a color image corresponding to the same scene as that of the depth image.

For example, one of feasible methods of acquiring a depth image based on a color image may include prediction of a depth image corresponding to a color image based on the color image using a depth image prediction model. In this example, an input of the depth image prediction model may be a color image of a scene, and an output of the depth image prediction model may be a depth image of the scene. The depth image prediction model may be obtained by training an initial model based on sample images, and the sample images may include a color image belonging to the same scene and a corresponding depth image.

In the image processing method according to the present disclosure, when the target image further includes a color image of the scene, features may be extracted from the color image, a second feature map may be acquired, and the object extraction result may be obtained based on the first feature map and the second feature map.

For example, when the color image of the scene is included in the target image and when a 2D feature of the object is reflected to the color image, the object extraction result may be obtained based on the first feature map (3D features). Also, the object extraction result may be allowed to be more accurate by combining 2D features (the second feature map) of the color image based on the first feature map.

In this example, a feature extraction scheme of the color image may be realized by an existing feature extraction method, for example, a convolutional neural network (CNN).

When the depth image is not acquired based on prediction of a color image, two images acquired by capturing the same scene may be aligned and processed in advance to minimize a difference between the two images. For example, the two images may be converted into images of the same angle, or into images of the same lighting. To avoid an effect by parallax of the two images, pixels of a depth image and a color image that are aligned may respectively correspond to each other. Image alignment processing may be realized by various methods.

In the image processing method, acquiring of the object extraction result based on the first feature map and the second feature map may include acquiring a third feature map corresponding to the target image by fusing the first feature map and the second feature map, and acquiring the object extraction result based on the third feature map.

When the object extraction result is acquired based on the first feature map and the second feature map, two feature maps may be fused into a single feature map (for example, the third feature map). The third feature map may include a 3D geometric feature of the first feature map, and may further include a 2D pixel feature of the second feature map.

In an example, a point of the point cloud data may be in a form of an image, and the third feature map may be obtained by connecting the first feature map and the second feature map in series.

In an example, acquiring of the object extraction result based on the third feature map may include acquiring the object extraction result by an output of an NN model, and the NN model may be trained by a scheme that is described below. First, sample images are obtained. Each of the same images includes a depth image and a color image of the same scene, and a label result of each object appears in each of the sample images and represents a 3D detection result of each object in the sample images. Second, based on a first feature map corresponding to the depth image and a second feature map corresponding to the color image among the sample images, a third feature map corresponding to each of the sample images is determined. Third, an initial network model is trained based on the third feature map corresponding to each of the sample images until a loss function of the initial network model converges, and a model when the training is terminated is used as an NN model. The loss function may represent a degree of difference between a label result and a prediction result of each of the sample images.

It an example, an NN model may be trained based on actual needs. For example, when the label result includes any one or any combination of an area image corresponding to each object of an image, a 2D image area segmentation result, a bounding box, and a key point, an output of the NN model may include any one or any combination of an area corresponding to each object included in the target image, the bounding box, or the key point. Based on the output of the NN model, extraction results of all objects may be acquired.

The acquiring of the object extraction result based on the third feature map may include acquiring a plurality of sub-images by segmenting the target image corresponding to the third feature map, determining extraction results of objects for each of the sub-images based on a third feature map corresponding to each of the sub-images and/or a third feature map corresponding to a sub-image adjacent to each of the sub-images, and acquiring the object extraction result by fusing the determined extraction results.

A portion of image areas (sub-images) of the target image may have a sub-feature map, and each of the sub-images may correspond to an extraction result of an object corresponding to each sub-feature map in the scene. In an example, when an image includes a plurality of objects, each sub-image may a sub-image corresponding to a different object, or object extraction results for each of a plurality of sub-images may correspond to the same object or different objects.

For the third feature map, each object in the target image may have a corresponding sub-feature map, and a sub-feature map may be a partial feature map of the third feature map. Thus, an extraction result of an object corresponding to a sub-image may indicate an extraction result of an object corresponding to a sub-feature map corresponding to the sub-image. When a sub-feature map refers to a partial feature map in the third feature map and when all sub-feature maps correspond to the entire third feature map, the object extraction result of the target image may be acquired by fusing all extraction results of objects for each of the sub-images.

In an example, it may be understood that when the object extraction result is determined based on the first feature map, sub-images may be determined based on the first feature map. When the object extraction result is determined based on the second feature map, sub-images may be determined based on the second feature map.

In an example, determining of the extraction results for each of the sub-images based on the third feature map corresponding to each of the sub-images and/or the third feature map corresponding to the sub-image adjacent to each of the sub-images may include determining a weight of each of the sub-images, and determining the extraction results for each of the sub-images based on the third feature map corresponding to each of the sub-images and/or the third feature map corresponding to the sub-image adjacent to each of the sub-images, and the weight of each of the sub-images.

For example, a possibility of whether each of the sub-images belongs to an object may be expressed by a weight. When the weight increases, a possibility that a corresponding sub-image belongs to the object may increase. When extraction results of objects for each of the sub-images are fused, a weight of each of the sub-images may be used to increase an accuracy of the determined extraction results.

The weight of each of the sub-images may be determined by the NN model. In other words, in a model training process, a model may be trained based on a weight and an extraction result of an object corresponding to each of the sub-images, and the weight of each of the sub-images may be determined based on the trained model.

Determining of a weight of each of the sub-images may include one of three schemes described below.

In a first scheme, a weight of each of the sub-images may be determined based on a sub-feature map corresponding to each of the sub-images.

Here, the weight of each of the sub-images may be determined based on a feature of the sub-feature map corresponding to each of the sub-images. In a sub-feature map corresponding to a sub-image, each of features of the sub-feature map may have a different possibility of belonging to each object. Thus, a weight of a sub-image may be determined based on a feature of the sub-image itself, and a possibility that the sub-image belongs to an object may be indicated by the weight.

In a second scheme, a candidate point of the target image may be determined, and a weight of each of the sub-images may be determined based on a candidate point corresponding to each of the sub-images.

Here, a candidate point may be a location of an object, and a location of an object in an image may be determined based on the candidate point. Due to different possibilities that each candidate point belongs to each object, a weight of each of the sub-images may be determined based on a candidate point corresponding to each of the sub-images, and a possibility that a sub-image belongs to an object may be indicated by the weight.

In a third scheme, a weight of each of the sub-images may be determined based on a sub-feature map corresponding to a candidate point corresponding to each of the sub-images.

Here, possibilities that each sub-feature map belongs to each object may be different, and a weight of a sub-image may also be determined based on a sub-feature map corresponding to a candidate point.

In an example, a scheme of determining a candidate point of the target image may include one of three schemes described below.

In a first scheme, each pixel point of the target image may be regarded as a candidate point of the target image.

Here, a location of an object in the target image may be accurately reflected based on pixel points, and an extraction result of the object may be accurately determined using pixel points as candidate points.

In a second scheme, a candidate point corresponding to each of the sub-images may be determined based on a pixel point corresponding to each of the sub-images.

Here, a candidate point corresponding to each sub-feature map may be determined based on a pixel point corresponding to each sub-feature image. The candidate point may correspond to a plurality of pixel points or a single pixel point.

To determine candidate points corresponding to a sub-image based on pixel points corresponding to the sub-image, a pixel point located at an intermediate location among the pixel points corresponding to the sub-image may be regarded as a candidate point of the sub-image. Also, a pixel point at a predetermined location other than the intermediate location, or a pixel point calculated by other schemes may be regarded as a candidate point.

In a third scheme, at least two sampling points for the target image may be obtained, and the target image may be segmented into at least two corresponding sub-images based on the at least two sampling points. A sampling point corresponding to each of the sub-images may be regarded as a candidate point.

Here, a sampling point may be a pixel point, and may perform sampling based on a set sampling rule as if sampling is performed once at an interval of "N" pixel points. The sampling rule may be set based on an actual rule, and the present disclosure is not limited to one of sampling rules.

In an example, for a plurality of sub-images, the following situations may exist.

In a first case, a plurality of sampling points may correspond to a single sub-image. For example, a distance between two adjacent sampling points among at least two sampling points may be less than a set value, which may indicate that the two sampling points correspond to the same object and that an area corresponding to the two sampling points is regarded as a sub-image.

In a second case, a single sampling point may correspond to a single sub-image. In other words, based on a number of at least two sampling points obtained by sampling, a number of sub-images corresponding to the number of at least two sampling points may be acquired.

In the first case, one sampling point among the plurality of sampling points corresponding to the sub-image may be regarded as a candidate point of the sub-image. In the second case, since the single sampling point corresponds to the single sub-image, the sampling point corresponding to the sub-image may be directly used as a candidate point.

In an example, determining of the weight of each of the sub-images based on the candidate point of each of the sub-images may include determining a similarity relationship between the candidate point of each of the sub-images and a candidate point of a sub-image adjacent to each of the sub-images, and determining the weight of each of the sub-images based on the similarity relationship.

For example, considering that adjacent sub-images may correspond to the same object, the weight of each of the sub-images may be determined based on a similarity relationship between objects corresponding to the adjacent sub-images. In this example, the similarity relationship between the objects corresponding to the adjacent sub-images may be represented by a similarity relationship between candidate points corresponding to the adjacent sub-images.

In an example, each candidate point may be expressed as a vector, and a similarity relationship between a candidate point and a neighboring candidate point may be expressed by an inner product of vectors. If a value of the inner product of the vectors is greater than a threshold, it may indicate that two candidate points are similar, and if a value of an inner product of two vectors is less than the threshold, it may indicate that the two candidate points are not similar. For the candidate point and the neighboring candidate point, a number of similar candidate points corresponding to each candidate point may be determined. Different numbers of candidate points may correspond to different weights, and when the number of candidate points increases, a possibility that the candidate points belong to a predetermined type of an object may increase and a corresponding weight may also increase. When weights are determined for each of the candidate point and the neighboring candidate point, the weights may be fused (for example, an average value may be obtained). The fused weights may be used as a weight corresponding to a candidate point. Accordingly, a similarity relationship between a sub-image and a neighboring sub-image may be used to determine a weight of the sub-image. Thus, the weight of the sub-image may be more accurately determined.

In an example, each candidate point may correspond to a fraction, and the fraction may indicate a probability that a corresponding candidate point belongs to a predetermined type of an object. When the probability increases, a possibility of belonging to the type of the object may increase.

In an example, normalization of a corresponding probability value may be additionally processed, and whether a corresponding candidate point belongs to the type of the object may be identified based on a normalization result. For example, when a normalization result of a candidate point greater than a set probability value is "1", the candidate point may be determined to belong to the type of the object. When a normalization result of a candidate point that is not greater than the set probability value is "0", the candidate point may be determined not to belong to the type of the object.

In an example of determining a weight of a sub-image A, sub-images B and C may be adjacent to the sub-image A, a candidate point a may correspond to the sub-image A, a candidate point b may correspond to the sub-image B, and a candidate point c may correspond to the sub-image C. Each candidate point may correspond to a vector, the candidate point a may correspond to a vector x, the candidate point b may correspond to a vector y, the candidate point c may correspond to a vector z, and an inner product of vectors between two candidate points may be calculated. When two candidate points are similar to the candidate point a, i.e., when both the candidate points b and c are similar to the candidate point a, one candidate point, i.e., the candidate point a may be similar to the candidate point b, and one candidate point, i.e., the candidate point a may be similar to the candidate point c. A weight corresponding to two similar candidate points may be w1, a weight corresponding to one similar candidate point may be w2, and a weight of the sub-image A corresponding to the candidate point a may be "(w1+w2+w1)/3". Based on the same principle, weights of other sub-images may also be determined using the above-described scheme, which is not repeated herein for brevity.

In training of an NN with the above-described scheme, each candidate point may correspond to a loss, and evaluation of each sub-image may also correspond to a loss. In a gradient back propagation process, a gradient corresponding to each sub-image may be constrained to avoid an extremely high gradient. To constrain the gradient, the gradient may be multiplied by a coefficient less than "1".

In an example, a location and category of an object may be predicted based on a feature of a central point (that is, a feature of a central location) of a sub-image (that may be referred to as an "anchor"), but an object in a nature scene may suffer from various problems such as occlusion or deformation. A previous anchor-based single-step method may be used to predict a category and location of an object using anchor-centered features, implicitly express an appearance of the entire object and use it for prediction. Since it is difficult for training data to include all half occlusions, it may be difficult for a trained model to learn appearances of all cases. When an object feature is in an occlusion area, a detection accuracy may decrease. To solve the above problem, prediction may be performed using a plurality of adjacent grids (that may be referred to as "sub-images") for each anchor. Adjacent grids may mainly represent a partial feature of an object (that may be referred to as a "sub-feature map"), i.e., an appearance of an object focused on a part. Through prediction of a non-occluded area, a strong detection may be still obtained. A model of the present disclosure may be based on RefineDet. However, RefineDet is used to perform prediction once for a single anchor, whereas a method according to the present disclosure may perform predictions several times. Accordingly, the method according to the present disclosure may be more robust against partial occlusion.

Figure 2:
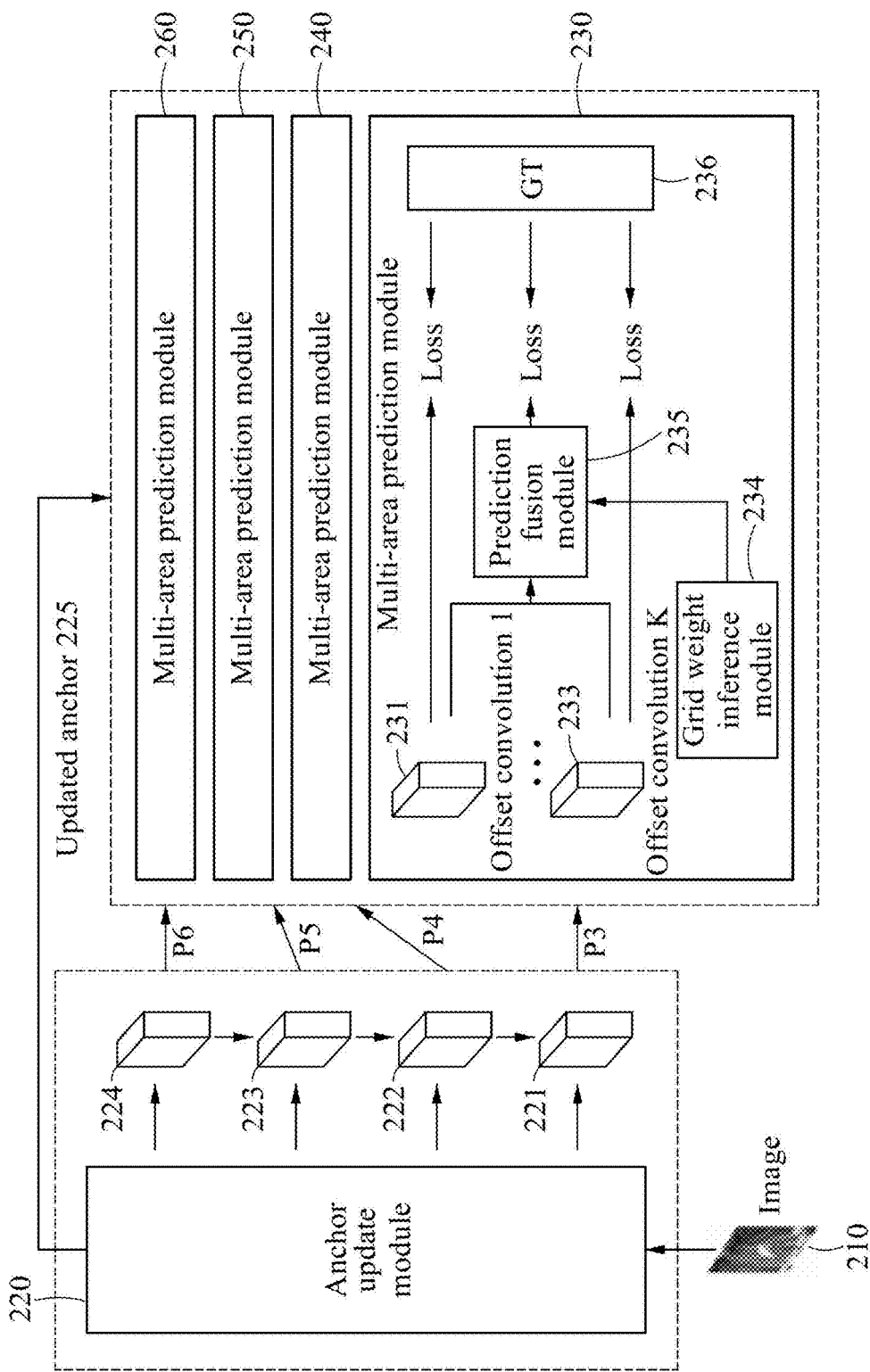
FIG. 2 illustrates an example of a method of determining an object extraction result based on a sub-image in an image processing method.

FIG. 2 illustrates an example of a method of determining an object extraction result based on a sub-image in an image processing method.

Referring to FIG. 2, the method of determining the object extraction result may detect four feature maps P3, P4, P5 and P6 using each of the feature maps 221, 222, 223 and 224 in a target image 210 to be processed using an anchor update module 220. The method may perform prediction using a multi-prediction scheme for each of the feature maps 221, 222, 223 and 224. In a training operation, multi-prediction may provide a multi-prediction loss. In a test operation, a plurality of prediction results may be combined into a final prediction result that may be referred to as an object extraction result, based on a weight of each grid.

In the method of FIG. 2, the final prediction result may be detected using multi-area prediction in each of the feature maps using P3, P4, P5 and P6 using feature maps 221, 222, 223 and 224. For each updated anchor 225, a location and a label of a category may be represented by a vector. The location and the label of the category may be simultaneously predicted. To obtain prediction sensitive to a location, adjacent grids in addition to an intermediate grid may be used for each anchor. In an example, for convenience, both the intermediate grid and a surrounding grid may be called adjacent grids. For each anchor, when a combined feature map, that is, the feature map P3 221 is obtained, prediction thereof may be obtained by statistics through prediction of a plurality of grids.

As shown in FIG. 2, prediction corresponding to the feature maps 221, 222, 223 and 224 may be obtained by multi-area prediction modules 230, 240, 250 and 260, respectively. In each of the multi-area prediction modules 230, 240, 250 and 260, an offset convolution may be performed on the feature map P3 221 using "K" predictors 231 and 233 to obtain a prediction output of "K" adjacent grids. At the same time, a weight of each grid may be obtained using a grid weight inference module 234. The above information may be fused by a prediction fusion module 235 to obtain a final prediction output. Prediction of each grid may correspond to a loss. An output of the prediction fusion module 235 may also correspond to the loss. Thus, it is possible to reduce excessive fitting.

In this example, a number of defined categories may be "N" and a number of adjacent grids may be "K". It is assumed that "M" anchors are in a feature layer. In the above scheme, a dimension of a prediction output of a layer may be (N+4)×M×K. A location may be indicated by a four-dimensional (4D) vector. Although five adjacent grids are used in the present disclosure, a number of adjacent grids may not be limited. Grids may have different reliability, and two schemes of inferring grid reliability may be provided. The prediction fusion module 235 may combine prediction results of different grids based on the reliability. In Equation 1 shown below, $\alpha_k$ is defined as a weight of a grid k, k=1, . . . K, $p_k$ denotes a feature map corresponding to the grid k, and s.t. denotes satisfaction of a constraint and is an abbreviation for satisfying "satisfy to" or tilting to "straint to". A prediction result $\bar{p}$ after combination of the prediction results is defined as shown in Equation 1 below.

$$\bar{p} = \Sigma_k \alpha_k p_k \quad s.t. \quad \Sigma_k \alpha_k = 1 \qquad (1)$$

Here, a bounding box of a final object in a map may be obtained based on a prediction result combined by $0 \leq \alpha_k \leq 1$, not a maximum suppression.

The predictors 231 and 233 may be defined for each of the "K" adjacent grids. Each of the predictors 231 and 233 may interpret information of a corresponding grid only. For example, a predictor of an upper grid may use only feature information around the upper grid. Similarly, a predictor of another grid may use only feature information around the other grid. Generally, all information may be inferred using area features. For example, when an area of a head is given, a location of the entire object may be inferred. Thus, a predictor of an adjacent grid may infer information of an object from a central grid. Even when a portion of an area is occluded, strong prediction may be obtained through prediction of other areas. The "K" adjacent grids may correspond to the same anchor. In other words, the "K" adjacent grids may have the same anchor parameters including a location (x,y), a width, and a height.

Anchors may be different in size. A relatively large anchor may tend to fall into an object area, and adjacent grids may tend to represent a portion of object information. In other words, the method disclosed herein may be similar to segmentation of an object. In this example, even when a portion of the object is occluded, the entire object may be detected by other portions. In the case of a relatively small anchor, adjacent grids may tend to include a portion of an appearance of an object and surrounding environment information. Since environment information is very useful for distinguishing relatively small objects, the above strategy is very effective in detecting relatively small objects.

In an example, two loss functions, for example, a classification loss $L_{class}$ and a location loss $L_{loc}$, may be provided. A total loss function L is defined as shown in Equation 2 below.

$$L = L_{loc} + L_{class} \qquad (2)$$

In Equation 2, $L_{loc}$ denotes a location loss of all anchors, and $L_{class}$ denotes a classification loss of all anchors. A soft-max loss function may be used as $L_{class}$, and smooth L1 may be used as $L_{loc}$. In a training operation, for each adjacent grid predictor, an independent loss may be defined. Thus, the "K" adjacent grids may have "K" losses. A combined prediction may also correspond to a loss. In a case of an i-th feature map and a k-th adjacent grid predictor, $L_{class}^{i,k}$ and $L_{loc}^{i,k}$ may define a classification loss and a location loss thereof, respectively. $\tilde{L}_{class}^{i}$ and $\tilde{L}_{loc}^{i}$ may define a classification loss and a location loss of the i-th feature map, respectively. F may define a feature map set used in prediction. A classification loss and a location loss may be defined as shown in Equations 3 and 4, respectively, below.

$$L_{class} = \sum_{i \in F} \sum_{j=1,\dots,K} L_{class}^{i,k} + \sum_{i \in F} \tilde{L}_{class}^{i} \qquad (3)$$

$$L_{loc} = \sum_{i \in F} \sum_{j=1,\dots,K} L_{loc}^{i,k} + \sum_{i \in F} \tilde{L}_{loc}^{i} \qquad (4)$$

Through multiple loss definitions, a larger number of constraints may be added in the present disclosure, which may reduce excessive fitting.

In the present disclosure, two schemes of inferring a weight of a grid may be provided. A first scheme may be based on information of a grid itself, and a second scheme may be based on a relationship between grids.

n the first scheme, a weight of each grid may be determined based on information of a grid itself. A weight of a grid may be affected by a feature of the grid. In an example, when grid features are more obvious, a relatively high reliability for prediction may tend to be provided. In another example, when grid features are blocked or noise increases, a reliability of prediction may decrease. An optimal grid weight may be obtained based on grid features using a training scheme. In other words, a weight of a grid may be obtained through a convolution scheme.

Figure 3:
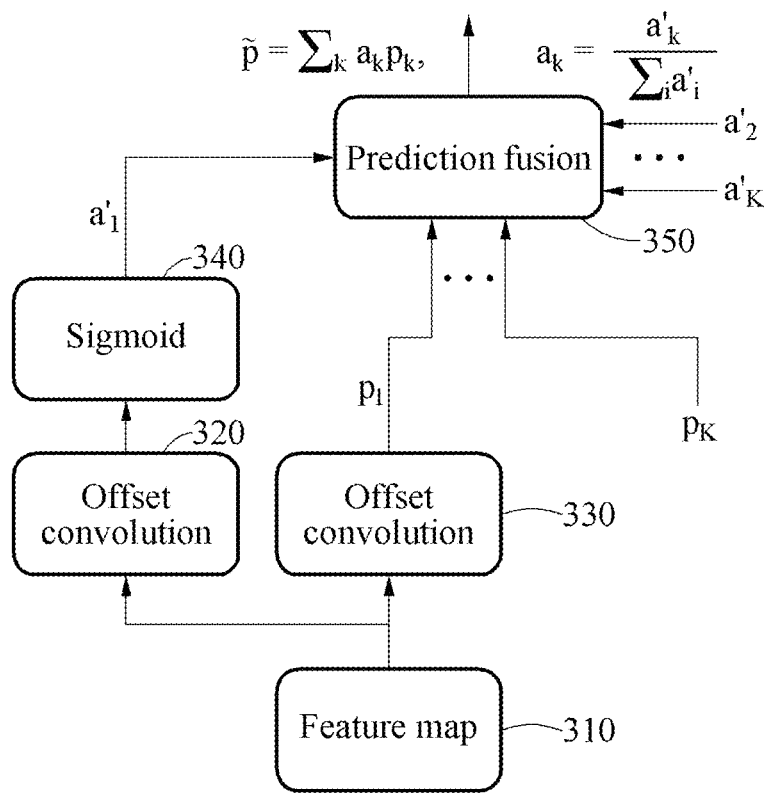
FIG. 3 illustrates an example of inferring a weight of a single grid based on information of the grid in an image processing method.

As shown in FIG. 3, when a feature map 310 such as P3 is given, prediction of a location and a category thereof may be obtained by an offset convolution 320, and a weight thereof may be obtained by an offset convolution 330 and a sigmoid 340. A weight and prediction of each grid may be input to a prediction fusion 350 and fused to obtain a final prediction output.

In an example of a lattice k, $\alpha'_k$ denotes a weight after a convolution. $\alpha'_k$ may be obtained by applying a sigmoid function to obtain a final weight $a_k$ as shown in Equation 5 below.

$$a_k = \frac{a'_k}{\sum_{i=1,\ldots,K} a'_i} \quad (5)$$

By performing Equation 5 for each of i=1, K, constraints of Equation 1 may be satisfied. Based on the above-described scheme, a more stable grid may obtain a higher weight.

In the second scheme, a weight of a grid may be inferred based on a relationship between grids. Although information about a relationship between grids is not used in the first scheme, the information may be very useful. There are three types of relationships between grids that may be used to infer weights of the grids.

Figure 4A:
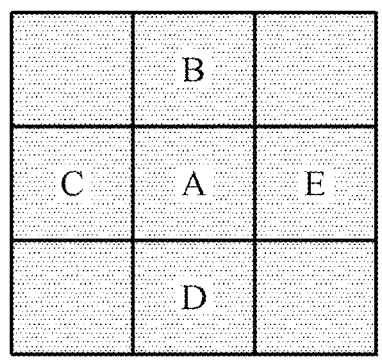
FIG. 4A illustrates an example of a distribution of five adjacent grids.

FIG. 4A shows five adjacent grids for an anchor in a grid A.

Figure 4B:
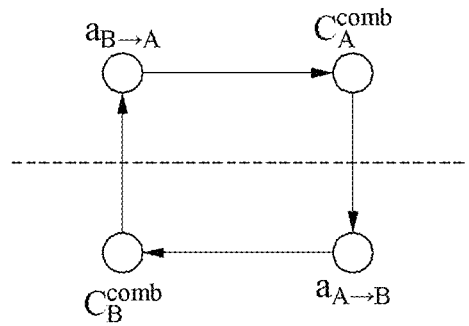
FIG. 4B illustrates an example of a dependency relationship between adjacent grids.

As shown in FIG. 4B, three types of relationships for a grid B may include, first, a feature set $F_B$ of adjacent grids, second, anchor prediction $C_B^{comb}$ at the grid B, and third, adjacent anchor prediction $C_B^{Neig}$ of the grid B with respect to the grid A. Based on the above relationships, weight prediction of an anchor B at the grid A may be defined as shown in Equation 6 below.

$$\alpha_{B \to A} = f(F_B, C_B^{comb}, C_B^{Neig}) \quad (6)$$

In Equation 6, $C_B^{comb}$ denotes an object relationship between adjacent grids. For example, an image may show a person on a horse. The person and the horse may appear at the same time. When grids are determined as the horse, a possibility that grids above the grids include the person may be high. However, $C_B^{comb}$ may need to be known and inference of $C_B^{comb}$ may depend on prediction $C_A^{comb}$, when category information of an anchor at the grid A is predicted as shown in FIG. 4B. When a feature map is given, the above connection relationship may constitute a map structure in the entire feature map. The map structure may be solved with a probability map model. To solve the above problem, a weight of a grid may need to be inferred using a reliability propagation scheme. This may make it difficult to end-to-end train a model.

To solve the above problem, in the present disclosure, Equation 7 may be defined as shown below, regardless of $C_B^{comb}$.

$$\alpha_{B \to A} = f(F_B, C_B^{Neig}) \quad (7)$$

Through the above scheme, end-to-end training may be performed. The above new relationship is shown in FIG. 4C.

Figure 4C:
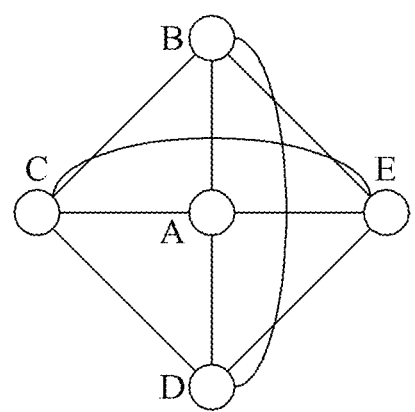
FIG. 4C illustrates another example of a dependency relationship between adjacent grids.

FIG. 4C illustrates a relationship between grids, regardless of $C_B^{comb}$. In FIG. 4C, a circle represents a grid, and a connection between grids indicates that two grids neighbor when weights of the grids are inferred. In FIG. 4C, each grid has four sides, is connected to another grid, and weights of different grids may be obtained as different features.

Figure 5:
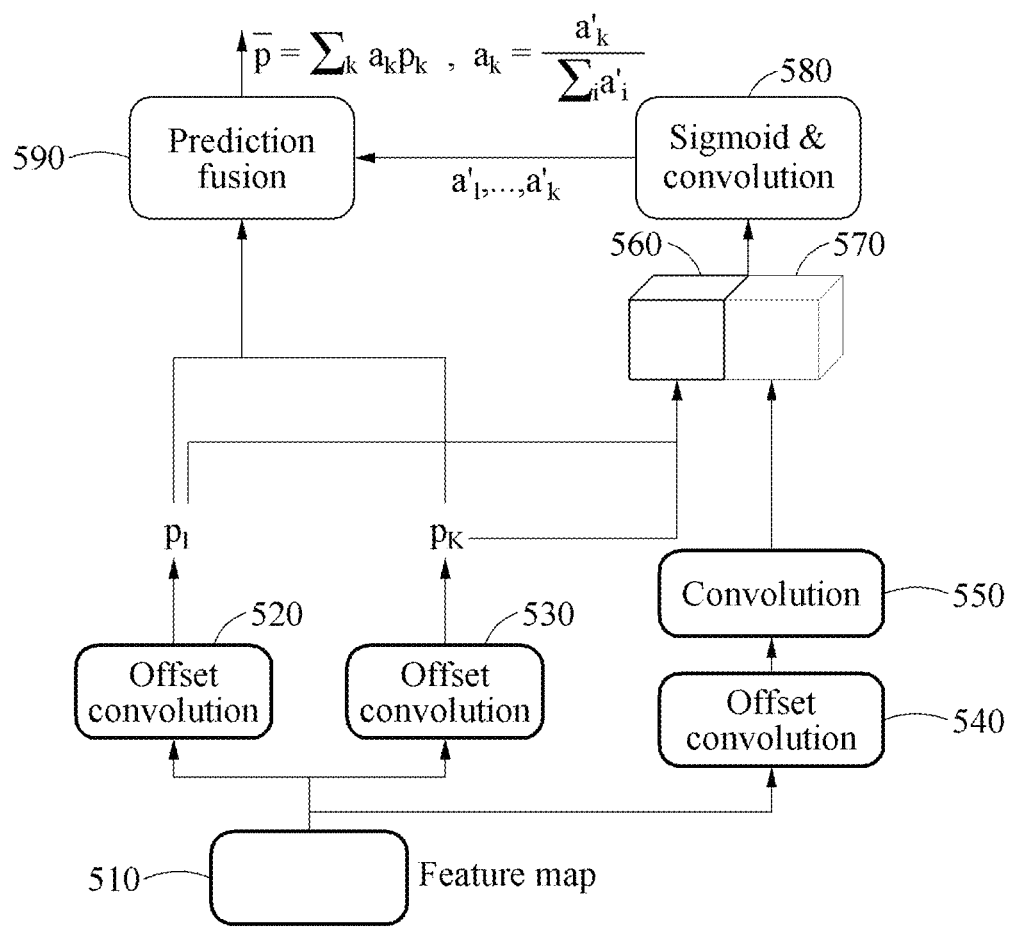
FIG. 5 illustrates an example of inferring a weight of a grid based on a relationship between adjacent grids in an image processing method.

FIG. 5 illustrates an example of inferring a weight of a grid based on a relationship between adjacent grids in an image processing method.

Referring to FIG. 5, for a given feature map 510, prediction of each grid may be obtained through "K" offset convolutions, for example, offset convolutions 520 and 530. The prediction may be spliced to obtain a single feature map. At the same time, the feature map may be acquired by an offset convolution 540 and a convolution 550. A relationship between grids may be represented by splicing two feature maps, for example, feature maps 560 and 570, and a weight of each of the grids may be obtained through a sigmoid and convolution 580 of the spliced feature maps. The above information may be fused through a prediction fusion 590 to acquire a final prediction output. In other words, a feature map may be acquired by combining features and category prediction of "K" adjacent grids, and a sigmoid and convolution operation may be performed on the feature map to obtain a weight of each grid.

In the present disclosure, the "K" adjacent grids may predict offset convolutions using a common anchor. To calculate an efficiency, a new layer to perform a convolution of different adjacent grids may be proposed. In the new layer, a reception field of an upper grid with respect to a predetermined anchor may be offset to "−1" in a vertical direction. For other adjacent grids, an offset of a reception field may adopt the same scheme. A scheme of inferring a weight of a second grid, five grids may be selected as a reception field. Through the above scheme, a process of combining multiple predictions and calculating a loss function may be more conveniently performed.

A gradient of a convolution branch may be constrained. During a gradient back propagation, gradients of the "K" adjacent grids may be summed and back propagated, which may indicate that the gradients may be multiplied by "K", thereby causing a gradient explosion often. To solve the above problem, gradients may be multiplied by a decimal number.

In an example, a weight of each sub-image may be determined based on a sub-feature map corresponding to each sub-image, using one of schemes described below.

In a first scheme, a first feature vector corresponding to a central position of each sub-image and a second feature vector corresponding to a sub-feature map corresponding to each sub-image may be determined, and the weight of each sub-image may be determined based on the first feature vector and the second feature vector corresponding to each sub-image.

Here, a feature corresponding to a central position of each sub-image may be likely to belong to a predetermined type of an object, and may be expressed as a feature vector, for example, the first feature vector. Based on the sub-feature map corresponding to each sub-image, a possibility that the sub-feature map belongs to a predetermined type of an object may be determined, and the sub-feature map may also be expressed as a feature vector, for example, the first feature vector. For the same sub-image, a weight of the sub-image may be determined based on an inner product between the first feature vector and the second feature vector, and the possibility that the sub-feature map belongs to the predetermined type of the object may be represented based on the weight, and accordingly a weight of the sub-image may be more accurately determined. Also, the second feature vector may be determined by an NN model.

In a second scheme, the sub-feature map corresponding to each sub-image may correspond to at least one probability value, each probability value may represent a probability of the sub-feature map belonging to a corresponding object, and a maximum probability value among probability values of corresponding objects may be a weight of a corresponding sub-image.

Here, when each sub-image corresponds to a sub-feature map and when each of sub-feature maps belongs to each object, all the sub-feature maps may have corresponding probability values, and each of the sub-feature maps may correspond to at least one probability value. A probability value may represent a probability that a corresponding sub-feature map belongs to the predetermined type of the object, and a maximum probability value may indicate a highest possibility that the corresponding sub-feature map belongs to the predetermined type of the object. The maximum probability value may be used as a weight of the sub-feature map.

Examples of a method of acquiring an object extraction result based on the color image and the depth image will be further described with reference to FIGS. 6 and 7.

Figure 6:
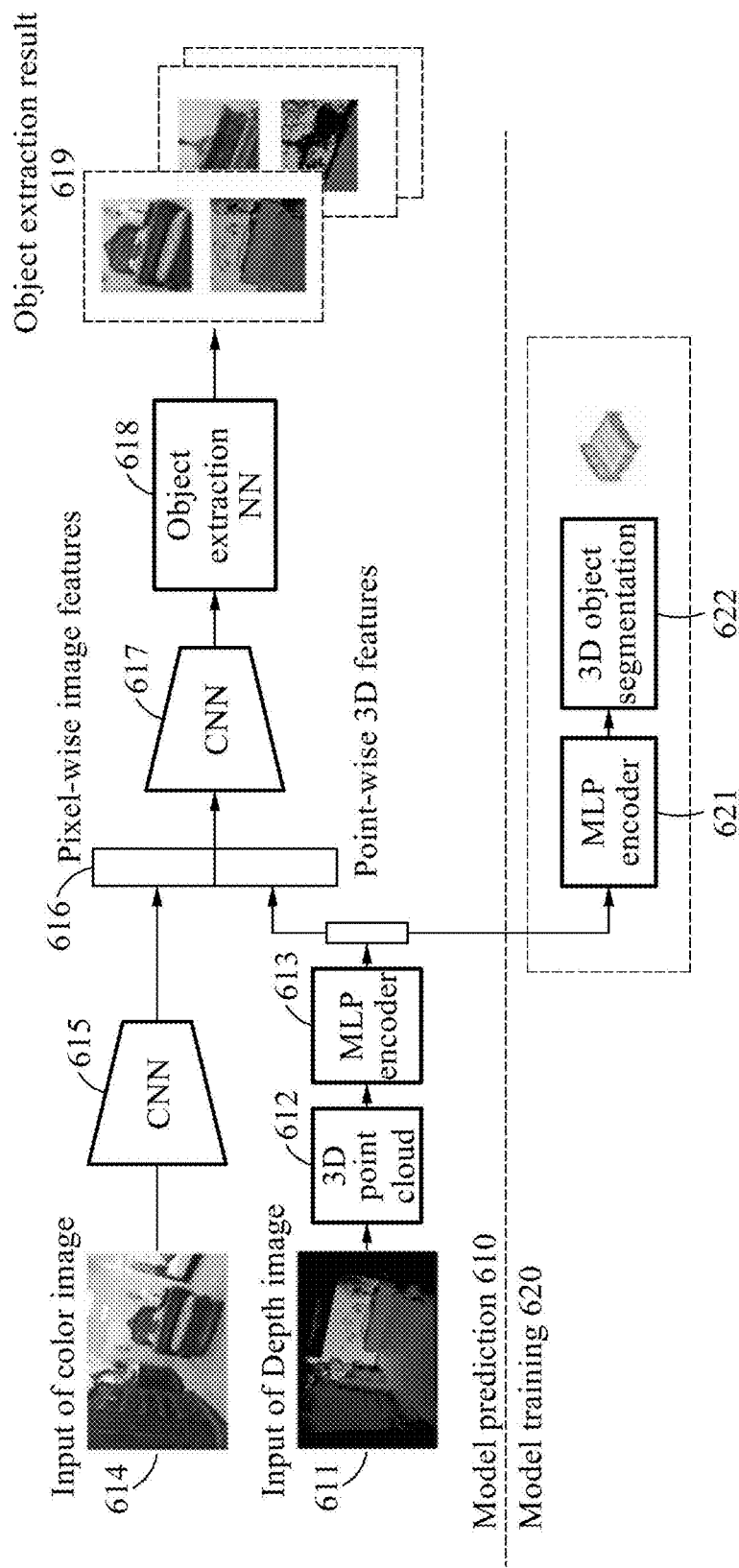
FIG. 6 illustrates an example of a method of determining an object extraction result based on a color image and a depth image in an image processing method.

FIG. 6 illustrates an example of a method of determining an object extraction result based on a color image and a depth image in an image processing method.

Figure 7:
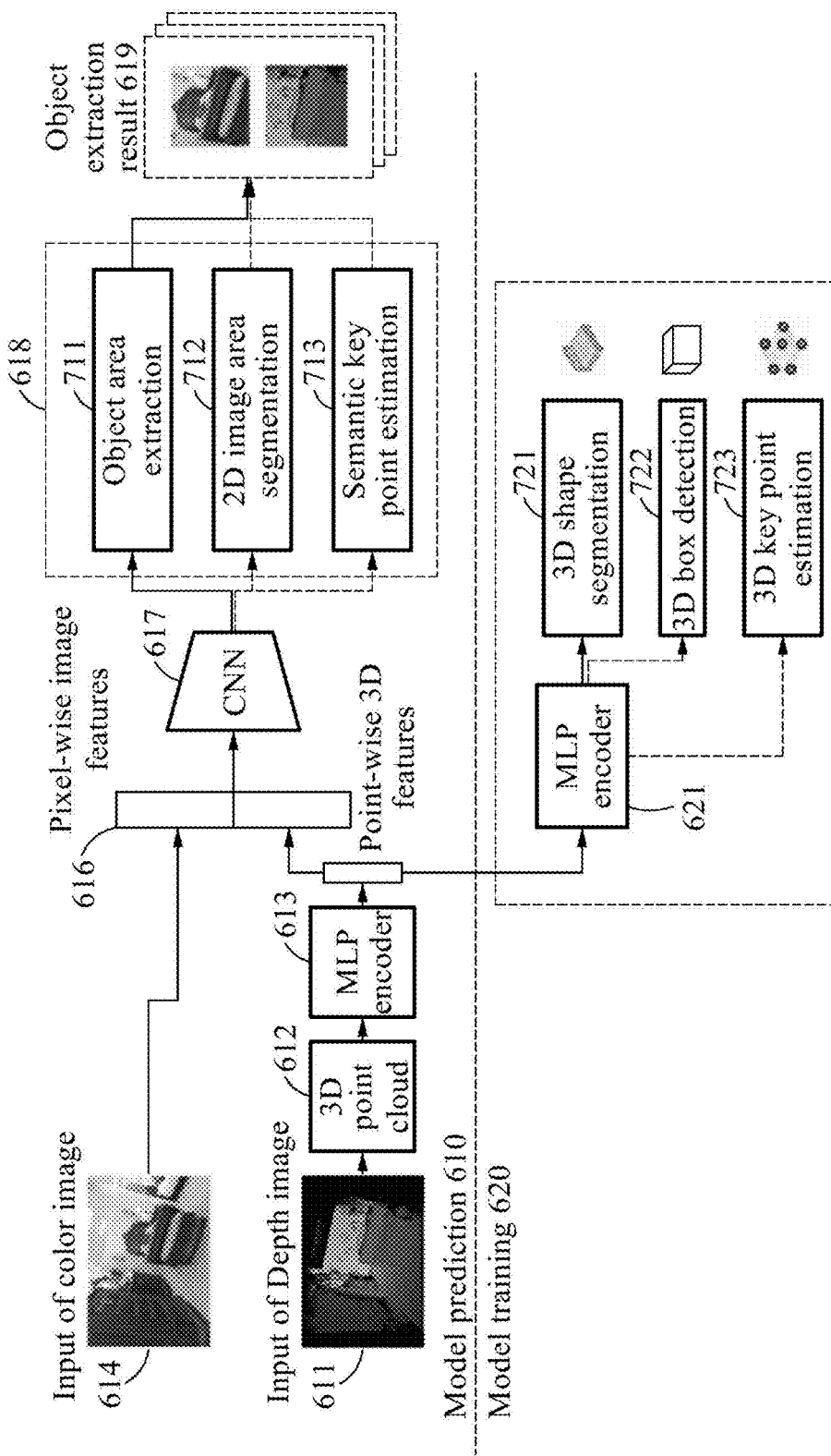
FIG. 7 illustrates another example of a method of determining an object extraction result based on a color image and a depth image in an image processing method.

FIG. 7 illustrates another example of a method of determining an object extraction result based on a color image and a depth image in an image processing method.

Referring to FIG. 6, model prediction 610 and model training 620 will be described. For the model training 620, a scheme of determining an object extraction result of an object included in a target image based on the target image will be mainly described. The target image may include a depth image 611 and a color image 614 corresponding to the same scene. A scheme of training an MLP encoder 621 will be mainly described. The MLP encoder 621 based on training may be used to extract 3D point cloud data, for example, a 3D point cloud 612.

In an example, an MLP encoder 613, the MLP encoder 621, CNNs 615 and 617, and an object extraction NN 618 may need to be trained first, and a predetermined training process has been described above, and accordingly further description is not repeated herein for brevity. In a training process of the MLP encoder 621, parameters of the MLP encoder 621 may be adjusted based on a 3D detection result of a sample image, as described above. An adjustment process of the MLP encoder 621 is described below. For example, when a difference between a prediction result (for example, a predicted 3D detection result of a sample image) and a label result (for example, a labeled 3D detection result of the sample image) does not satisfy a convergence condition by comparing the prediction result and the label result, parameters of the MLP encoder 621 may be adjusted until the difference between the prediction result and the label result satisfies the convergence condition. In this example, a trained model may be used as the MLP encoder 613.

The above prediction result may include a 3D object frame (for example, 3D box detection 722 of FIG. 7), a 3D key point (for example, 3D key point estimation 723 of FIG. 7), and a 3D object segmentation result (for example, 3D shape segmentation 721 of FIG. 7). It may be understood that the 3D detection results may be combined and used during training. Based on the 3D detection results, whether a feature extracted by the MLP encoder 621 is exact may be determined.

An NN model may include, for example, the CNNs 615 and 617, and the object extraction NN 618. Using a trained NN model, the object extraction result, for example, an object extraction result 619 of FIG. 6, of the object in the target image may be acquired based on a third feature map.

A feature of the color image 614 may be extracted using the CNN 615 to obtain a second feature map. The second feature map may include pixel-wise image features, that is, 2D features.

The depth image 611 may be converted into 3D point cloud data (for example, the 3D point cloud 612), and a feature may be extracted from the 3D point cloud data using the trained MLP encoder 613 to obtain a first feature map. The first feature map may include point-wise 3D features, and the point-wise 3D features may describe 3D structure features of an object in a 3D space.

The third feature map may be acquired by fusing the first feature map and the second feature map in operation 616. The third feature map may be input to the CNN 617. When the third feature map is additionally processed using the CNN 617, an output of the CNN 617 may be input to the object extraction NN 618, and the object extraction result 619 may be acquired using the object extraction NN 618. As shown in FIG. 7, an output of the object extraction NN 618 may include any one or any combination of an area image (for example, object area extraction 711) corresponding to the object in the target image, a bounding box, a 2D image area segmentation result 712, or a key point (for example, semantic key point estimation 713). Based on the output of the object extraction NN 618, the object extraction result 619 may be determined.

Since the target image includes the depth image 611 and the color image 614, each of the depth image 611 and the color image 614 may correspond to one object extraction result when the object extraction result 619 is an image with object area identification. For example, an object extraction result corresponding to the depth image 611 may be a depth image with object area identification, and an object extraction result corresponding to the color image 614 may be a color image with object area identification.

In the image processing method according to an example, a 3D detection result of an object included in the target image may be determined based on an object extraction result, and the 3D detection result may include either one or both of a 3D pose result and a 3D segmentation result.

Here, when an object extraction result of the object included in the target image is determined, additional processing may be performed based on the object extraction result. For example, the 3D detection result of the object included in the target image may be determined based on the object extraction result. In this example, the 3D pose result may represent a pose of an object in an image, for example, a rotation angle and a parallel distance of the object in the image. The 3D segmentation result may indicate that an image is not segmented. For example, when an image includes a bed and a sofa, the 3D segmentation result may indicate that the image is segmented into the bed and the sofa and a corresponding segmentation result is 3D. In other words, a 3D geometric feature of an object may be displayed.

In an example, determining of the 3D detection result of the object included in the target image based on the object extraction result may include extracting a 2D image feature and a 3D point cloud feature corresponding to the object extraction result, acquiring a fourth feature map by splicing the 2D image feature and the 3D point cloud feature, and determining the 3D detection result of the object included in the target image based on the fourth feature map.

Features may be extracted from the object extraction result when the 3D detection result of the object is determined, and the object extraction result may be based on a depth image and a color image. Accordingly, the 3D point cloud feature (for example, a feature corresponding to the depth image) and the 2D image feature (for example, a feature corresponding to the color image) may be extracted from the object extraction result, and the 3D detection result of the object may be more accurately determined based on the 3D point cloud feature and the 2D image feature.

In an example, when the 3D detection result includes a 3D segmentation result and when the target image includes an object of an incomplete shape, an extraction result of an object included in a scene may be acquired based on the 3D point cloud data.

In other words, the image processing method according to an example may complete 3D point cloud data corresponding to the object of the incomplete shape based on the object of the incomplete shape, may acquire the completed 3D point cloud data, and may acquire the extraction result of the object included in the scene based on the completed 3D point cloud data.

During photographing, an object of an image may not be completely captured due to a photographing reason or other reasons. For example, a depth image may be captured based on a depth sensor, a shape of an object included in a captured image may be incomplete due to an occlusion or reflection of an object surface, and a missing part may be present. The image processing method according to an example may complete the shape of the object so that the object in the object extraction result may have a complete shape.

In an example, a shape of 3D point cloud data corresponding to an object of an incomplete shape based on a 3D shape completion network of an object configured by an MLP encoder and an MLP decoder. An input of the 3D shape completion network of the object may be the 3D point cloud data corresponding to the object of the incomplete shape, and an output may be 3D point cloud data after completion. The 3D shape completion network of the object may be obtained by training an initial model based on 3D point cloud data corresponding to an object of a complete shape and the 3D point cloud data corresponding to the object of the incomplete shape. When a difference between a prediction result and a label result (for example, 3D point cloud data corresponding to an object of a complete shape) is a loss function and when the loss function converges, a corresponding initial model may be the 3D shape completion network of the object. Here, an earth mover's distance (EMD) between a feature point corresponding to the prediction result and a feature point corresponding to the label result may represent the difference between the prediction result and the label result. When the EMD is less than a set distance, the loss function may converge. When the EMD is not be less than the set distance, the loss function may not converge.

Figure 8:
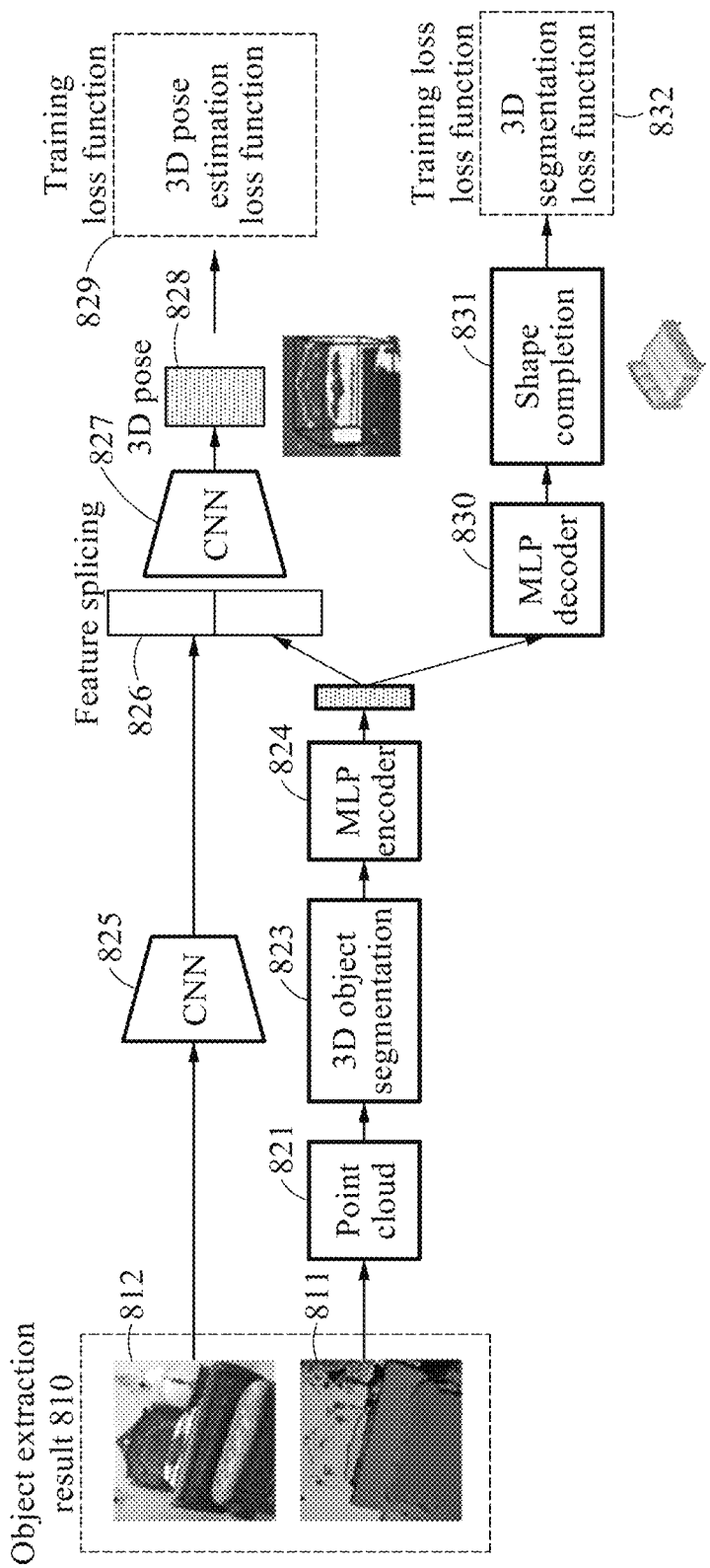
FIG. 8 illustrates an example of a shape completion method.

FIG. 8 illustrates an example of a shape completion method.

FIG. 8 illustrates a test process of a 3D shape completion network. In the test process of the 3D shape completion network, an object extraction result 810 may be an image including an object area, a first image 812 may be an object extraction result of a color image, and a second image 811 may be an object extraction result of a depth image. The second image 811 may be converted to 3D point cloud data 821 based on the first image 812 and the second image 811, 3D object segmentation 823 of the 3D point cloud data 821 may be performed to segment the 3D point cloud data 821 into points belonging to an object, and features of the 3D point cloud data 821 after the 3D object segmentation 823 may be extracted using an MLP encoder 824 to acquire a feature map (for example, a 3D point cloud feature) corresponding to the second image 811. Based on the feature map, the 3D shape completion network including the MLP encoder 824 and an MLP decoder 830 may perform shape completion 831 of an object with an incomplete shape in the feature map, and the completed feature map may determine a difference between a corresponding prediction result as a prediction result and a label result corresponding to the object with the incomplete shape. When the difference is less than a first set value, a loss function (for example, a 3D segmentation loss function 832) may converge. When the difference is not less than the first set value, the loss function may not converge, and parameters of the 3D shape completion network may need to be adjusted so that the loss function may converge.

Similarly, features for the first image 812 may be extracted using a CNN 825, a feature map (for example, a 2D image feature) corresponding to the first image 812 may be acquired, fusion 826 may be performed by performing feature splicing of the feature map corresponding to the first image 812 and the feature map corresponding to the second image 811, and a feature map (for example, a fourth feature map) after splicing may be acquired. The feature map after the splicing may acquire a 3D pose result 828 of an object with an incomplete shape using a CNN 827. A difference between the 3D pose result 828 as a prediction result and a label result corresponding to the object with the incomplete shape may be determined. When the difference is less than a first set value, a 3D pose estimation loss function 829 may converge. When the difference is not less than the first set value, the 3D pose estimation loss function 829 may not converge, and parameters of the 3D shape completion network may need to be adjusted so that the 3D pose estimation loss function 829 may converge.

In the above-described 3D shape completion network training process, any one or any combination of a 3D key point estimation result, a shape completion result and a 3D shape matching result may be used as a prediction result, in addition to a 3D pose result of an object. The parameters of the 3D shape completion network may be adjusted using a corresponding loss function based on the prediction result and a corresponding label result.

Figure 9:
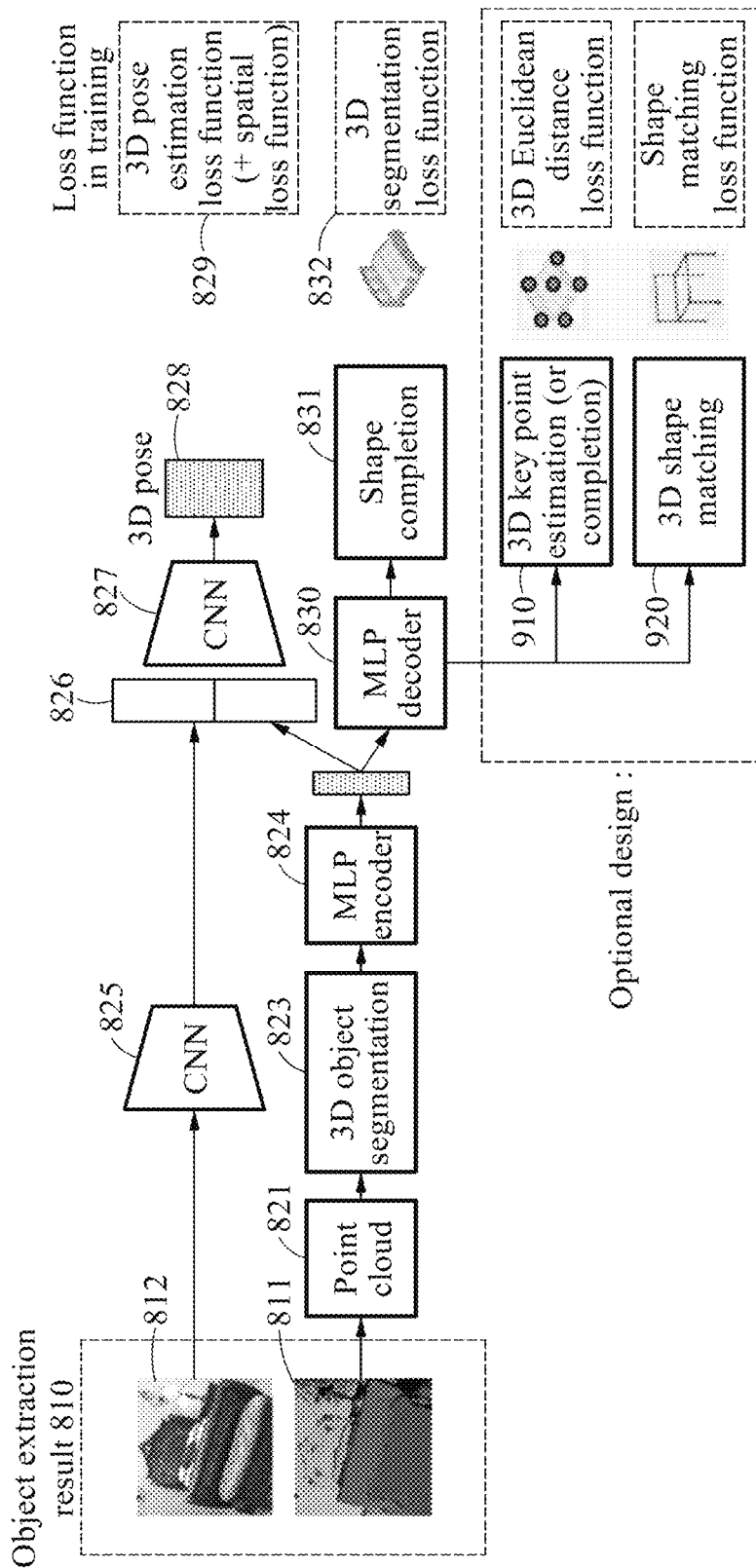
FIG. 9 illustrates another example of a shape completion method.

FIG. 9 illustrates another example of a shape completion method.

In FIG. 9, a 3D shape completion network may be trained based on a 3D key point estimation result 910 and a 3D shape matching result 920 that are other prediction results. A loss function corresponding to the 3D key point estimation result 910 may be a 3D Euclidean distance loss function, and a loss function corresponding to the 3D shape matching result 920 may be a shape matching loss function. An image processing method according to an example may adjust parameters of the 3D shape completion network based on one of prediction results and a corresponding loss function.

In an example, an extraction result of an object in a scene may be acquired based on a first feature map through an output of an NN model. The NN model may be trained and obtained using a scheme described below.

Sample images are obtained. Each of the sample images includes a depth image of a scene. A label result of each object appears in each of the sample images, and represents an extraction result of each object included in each of the sample images.

An initial network model is trained based on a feature map of a depth image corresponding to each of the sample images until a loss function of the initial network model converges, and a model when the training is terminated is used as an NN model. A value of the loss function may represent a degree of difference between a label result and a prediction result of each of the sample images.

Here, the extraction result acquired based on the first feature map may be acquired through the output of the NN model. In other words, an input of the NN model may be the first feature map, and the output may be any one or any combination of an area image corresponding to an object included in the above-described target image, a bounding box, a 2D image area segmentation result and a key point. Based on the output of the NN model, an extraction result of an object included in the target image may be acquired.

An extraction result of an object in a scene based on the above-described third feature map may also be acquired through the output of the NN model, an input of the NN model may be the third feature map, and the output may be the extraction result of the object.

Thus, the NN model may be trained and obtained by the above-described scheme, and accordingly further description is not repeated herein for brevity.

In an example, a sample image may include a plurality of objects, and a label result may include a spatial location relationship between object pairs among the plurality of objects. A prediction result may include an extraction result of each of the plurality of objects and a spatial location relationship between object pairs among the plurality of objects, each of the object pairs may include adjacent objects, and the spatial location relationship may represent an overlapping volume between adjacent objects.

The loss function of the initial network model may include a first loss function and a second loss function. A value of the first loss function may indicate a degree of difference between a prediction result of each object in a sample image and a label result corresponding to each object, and a value of the second loss function may indicate a degree of difference between a prediction result corresponding to each object pair among the plurality of objects and a corresponding label result.

Here, two adjacent objects may appear in a scene, and may overlap or not overlap. A location relationship between the two adjacent objects may have an influence on an object extraction result. For example, when a portion of a chair is under a table in a scene, volumes of the chair and the table may overlap. Extraction results of the chair and the table may be more accurately determined based on a 3D location relationship between the chair and the table.

Accordingly, in an NN model training process, a loss function may include a degree of difference between a prediction result of an individual object and a label result corresponding to each object, and may also be based on a degree of difference between a prediction result corresponding to each object pair and a corresponding label result. Here, a spatial location relationship may be determined based on a 3D bounding box of each of objects in an object pair, and whether two objects have an overlapping volume may be determined based on a 3D bounding box of each of the two objects.

As an optional scheme, a second loss function may be represented by Equation 8 shown below.

$$\text{loss\_s} = (1-s)\text{overlap}(3\text{Dbox\_1}, 3\text{Dbox\_2}) + s*\text{margin} (1-t) \quad (8)$$

In Equation 8, loss_s denotes the second loss function, 3Dbox_1 denotes a 3D bounding box of an object, 3Dbox_2 denotes a 3D bounding box of another object, and overlap (3Dbox_1, 3Dbox_2) denotes an overlapping volume between two objects. s denotes ground truth (GT), that is, a label result corresponding to the two objects. Also, $s \in \{0, 1\}$, and margin denotes a constant greater than "0" and may be configured according to actual needs. For example, the margin may be a maximum value greater than volume values of all possible overlapping areas. When the second loss function is equal to the margin, the second loss function may not converge. When the second loss function is equal to "0", the second loss function may converge.

If overlap(3Dbox_1, 3Dbox_2) is greater than "0", t may be equal to "1". If overlap(3Dbox_1, 3Dbox_2) is equal to "0", t may be equal to "0". "1" may indicate that the two objects overlap, and "0" may indicate that the two objects do not overlap.

As shown in Equation 8, the second loss function loss_s may be "(1−s)overlap(3Dbox_1, 3Dbox_2)" if "overlap (3Dbox_1, 3Dbox_2)>0" and "t=1" are satisfied, and the second loss function loss_s may be "s*margin(1−t)" if "overlap(3Dbox_1, 3Dbox_2)=0" and "t=0" are satisfied.

For example, "s=1" may indicate that the two objects overlap. In this example, when a prediction result is a loss function corresponding to "overlap(3Dbox_1, 3Dbox_2)>0" and "t=1", "loss_s=(1−s)overlap(3Dbox_1, 3Dbox_2)=0" and "loss_s=0" may indicate that there is no difference between the prediction result and the label result and that the second loss function converges. When the prediction result is a loss function corresponding to "overlap(3Dbox_1, 3Dbox_2)=0", "loss_s=s*margin(1−t)=margin" and "loss_s=margin" may be satisfied, and the second loss function may not converge.

Similarly, "s=0" may indicate that the two objects do not overlap. When the prediction result is a loss function corresponding to "overlap(3Dbox_1, 3Dbox_2)=0" and "t=0", "loss_s=s*margin(1−t)=0" and "loss_s=0" may indicate that there is no difference between the prediction result and the label result and that the second loss function converges. When the prediction result is a loss function corresponding to "overlap(3Dbox_1, 3Dbox_2)>0" and "t=1", "loss_s=(1−s)overlap(3Dbox_1, 3Dbox_2)=overlap(3Dbox_1, 3Dbox_2)>0" may indicate that the second loss function does not converge.

In a training process of a model, the second loss function may be calculated corresponding to a 3D pose result of a pair of objects acquired from an extraction result of adjacent objects based on the above scheme.

Figure 10:
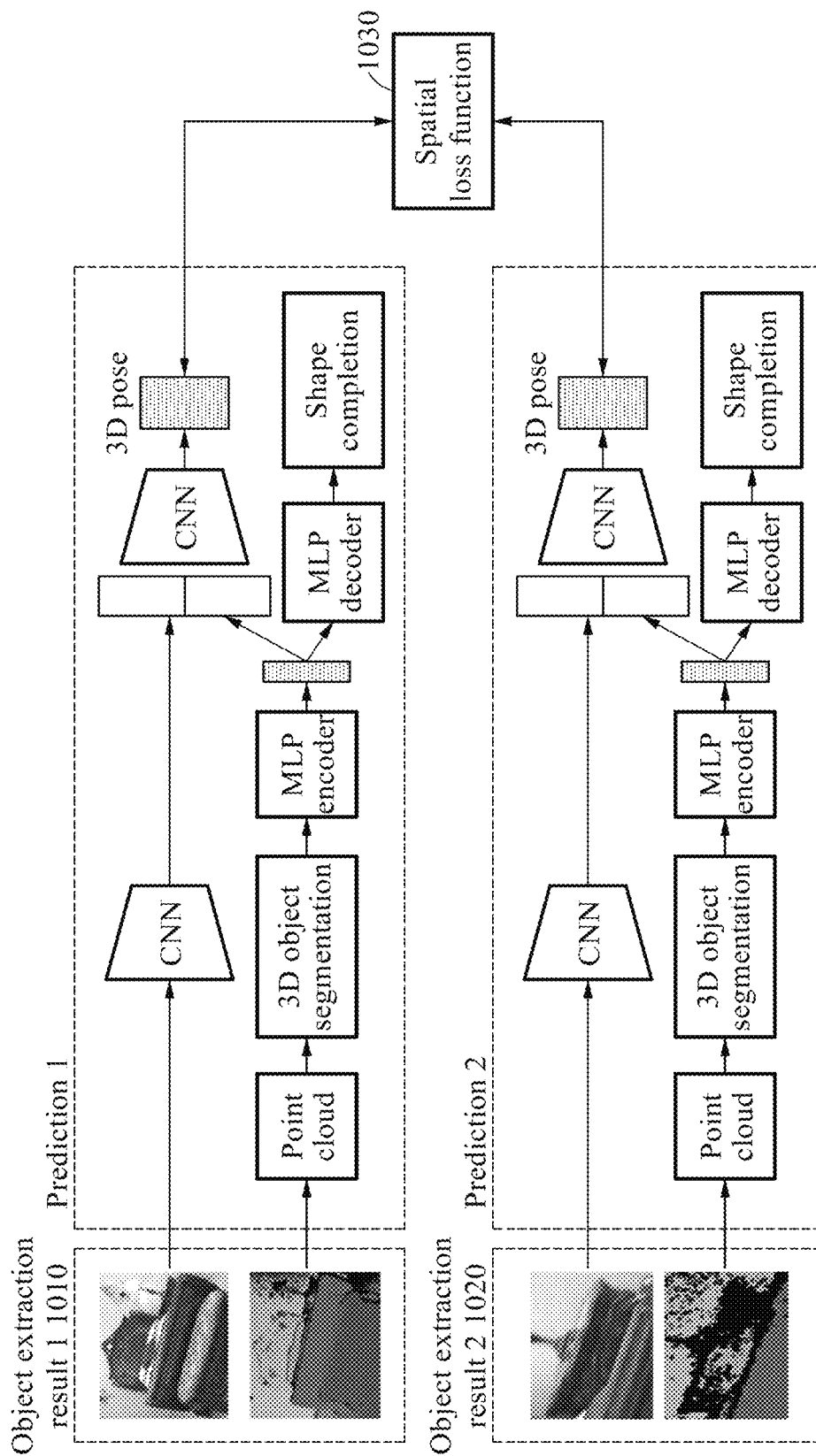
FIG. 10 illustrates an example of a method of training a model based on a spatial loss function.

FIG. 10 illustrates an example of a method of training a model based on a spatial loss function.

As shown in FIG. 10, a second loss function may update parameters of a model through back propagation in a training process, and accordingly the model may learn an ability to use a spatial relationship between adjacent objects in a 3D space. For example, in training of the model based on the second loss function as shown in FIG. 10, an object extraction result 1 1010 and an object extraction result 2 1020 are shown in FIG. 10 based on extraction results of two adjacent objects, a 3D pose of each of the objects may be determined based on the object extraction result 1 1010 and the object extraction result 2 1020. A process of determining the 3D pose is the same as a process of determining a 3D pose described with reference to FIG. 8, and accordingly further description is not repeated herein for brevity. A degree of difference between a prediction result corresponding to the object extraction result 1 1010 as a prediction result of two acquired 3D poses and a corresponding label result, and a degree of difference between a prediction result corresponding to the object extraction result 2 1020 and a corresponding label result may be determined, and the parameters of the model may be updated based on the degrees of difference and the second loss function (for example, a spatial loss function 1030). Accordingly, the model may learn the ability to use the spatial relationship between the adjacent objects in the 3D space.

Figure 11:
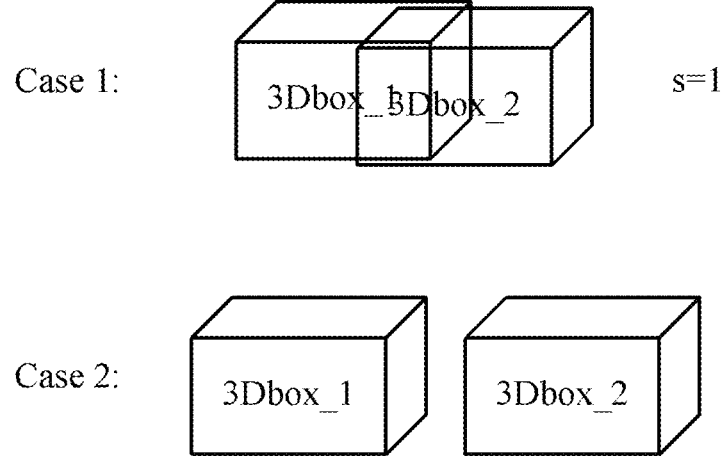
FIG. 11 illustrates an example of a spatial location relationship of three-dimensional (3D) bounding boxes of two adjacent 3D objects.

FIG. 11 illustrates an example of a spatial location relationship of 3D bounding boxes of two adjacent 3D objects.

In a spatial location relationship between two images as shown in FIG. 11, case 1 indicates that there is an overlapping volume between an object corresponding to 3Dbox_1 and an object corresponding to 3Dbox_2. In case 1, s is equal to 1. Case 2 indicates that there is no overlapping volume between the object corresponding to 3Dbox_1 and the object corresponding to 3Dbox_2, and s is equal to 0.

Figure 12:
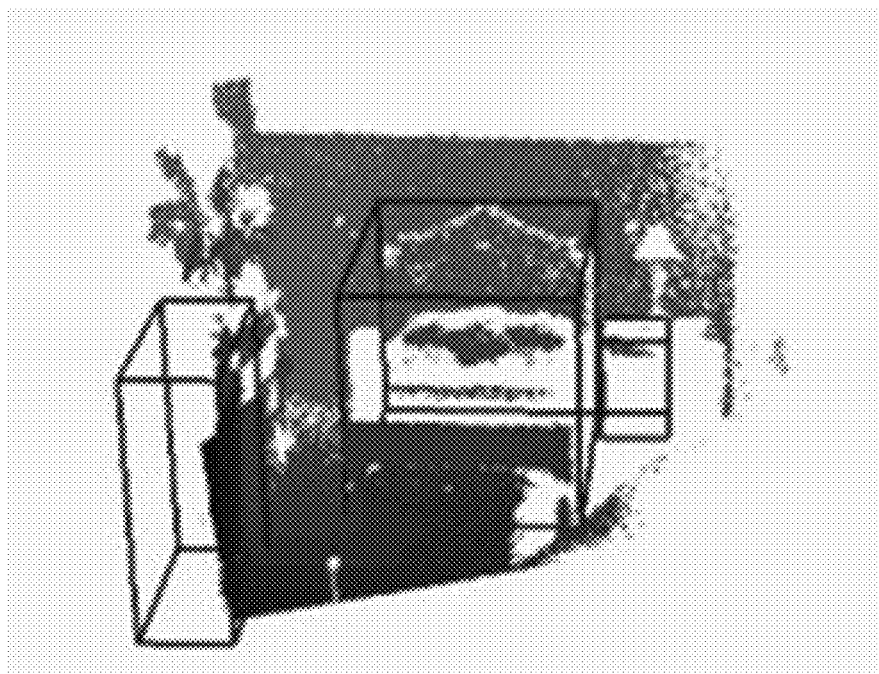
FIG. 12 illustrates another example of a spatial location relationship of 3D bounding boxes of two adjacent 3D objects.

FIG. 12 illustrates another example of a spatial location relationship of 3D bounding boxes of two adjacent 3D objects.

FIG. 12 illustrates three 3D bounding boxes corresponding to three objects. The three bounding boxes may respectively correspond to three different objects, there is no overlapping area between the three bounding boxes, and the example of FIG. 12 corresponds to the case 2 of FIG. 11.

In an NN model training process, when a first loss function is a 3D pose estimation loss function, a loss function of an initial model may be understood to be the 3D pose estimation loss function and the spatial loss function 829 of FIG. 9.

In an example, determining of a 3D detection result of an object included in a target image based on an object extraction result may include determining an initial 3D detection result of the object included in the target image based on the object extraction result, determining an original image that corresponds to the object included in the target image and that is an image corresponding to an object with a reference pose, determining difference information corresponding to an initial 3D detection result of each object based on the initial 3D detection result of each object and a corresponding original image, and determining a 3D detection result of each object included in the target image, by updating an initial 3D detection result of a corresponding object based on the difference information.

Here, in a process of determining a 3D detection result of each object included in the target image based on the object extraction result, the initial 3D detection result may be adjusted based on the original image corresponding to each object to enhance an accuracy of the 3D detection result. In other words, the initial 3D detection result may be refined based on the original image to increase the accuracy of the 3D detection result. Based on the difference information corresponding to the initial 3D detection result, whether the initial 3D detection result is accurate may be indicated. When the difference information corresponding to the initial 3D detection result satisfies a set condition, the initial 3D detection result may be relatively accurate and may not need to be updated. When the difference information corresponding to the initial 3D detection result does not satisfy the set condition, the initial 3D detection result may not be sufficiently accurate and may need to be updated. Herein, the set condition may be configured according to actual needs.

Also, the original image may be an image in a CAD model of an object, and the reference pose may be an arbitrary pose of an object, for example, a front pose.

The 3D detection result of the object in the target image based on the object extraction result may also be understood to be realized through the NN model. During the NN model training process, parameters of the NN model may be updated based on a scheme of updating an initial 3D detection result of a corresponding object based on the difference information corresponding to the initial 3D detection result. In other words, when the difference information does not satisfy a set condition, model parameters may be updated. When difference information corresponding to the updated initial 3D detection result satisfies the set condition, updating of the model parameters may be stopped. Here, based on the obtained NN model, a more accurate 3D detection result may be acquired.

In an example, determining of the original image corresponding to the object included in the target image may include determining an object category of each object based on an initial 3D segmentation result of each object, and determining an original image corresponding to each object based on the object category of each object.

Since different objects belong to different categories, an original image corresponding to an object may be more accurately determined based on an object category. The original image may be, for example, a 3D CAD image.

In an example, the initial 3D detection result may include an initial 3D pose result, and determining of the difference information corresponding to the initial 3D detection result of each object based on the initial 3D detection result of each object and the corresponding original image may include performing a pose transformation with respect to the corresponding original image based on an initial 3D pose result of each object, acquiring a transformed image corresponding to each object, and determining the difference information corresponding to the initial 3D detection result of each object based on the initial 3D detection result of each object and the transformed image.

Here, the difference information corresponding to the initial 3D detection result of each object may be determined using an alignment estimation scheme based on the initial 3D detection result of each object and a corresponding original image. For example, the initial 3D detection result of each object may include pose information corresponding to each object, i.e., an initial 3D pose result. An image processing method may perform a pose transformation with respect to a corresponding original image based on pose information of each object so that an object of a transformed image may have the same pose as that of an object corresponding to the initial 3D pose result. Also, the image processing method may determine information about a difference between each object and the transformed image, i.e., difference information corresponding to the initial 3D detection result of each object, based on the transformed image and a corresponding initial 3D detection result. The difference information may include either one or both of difference information corresponding to the initial 3D pose result and difference information corresponding to the initial 3D segmentation result. In other words, in the image processing method, when the determined difference information is the difference information corresponding to the initial 3D pose result, the initial 3D pose result may be updated based on the corresponding difference information. Also, in the image processing method, when the determined difference information is the difference information corresponding to the initial 3D segmentation result, the initial 3D segmentation result may be updated based on the corresponding difference information.

Here, the difference information may include, for example, missing points and error points in the initial 3D segmentation result, and 3D pose error points corresponding to the initial 3D pose result.

In the image processing method according to an example, in a process of determining the difference information corresponding to the initial 3D detection result of each object based on the initial 3D detection result of each object and the corresponding original image, the difference information corresponding to the initial 3D detection result of each object may be determined based on 3D point cloud data corresponding to the initial 3D detection result of each object and 3D point cloud data corresponding to the original image.

Also, in the image processing method, in a process of determining the difference information corresponding to the initial 3D detection result of each object based on the 3D point cloud data corresponding to the initial 3D detection result of each object and the 3D point cloud data corresponding to the original image, the 3D point cloud data corresponding to the initial 3D detection result and the 3D point cloud data corresponding to the original image may be normalized first to facilitate processing. Based on the normalized 3D point cloud data corresponding to the initial 3D detection result and the normalized 3D point cloud data corresponding to the original image, the difference information corresponding to the initial 3D detection result of each object may be determined.

Here, a normalization scheme may be performed to perform sampling of the 3D point cloud data corresponding to the original image, so that the 3D point cloud data corresponding to the original image and the 3D point cloud data corresponding to the initial 3D detection result may have the same point cloud density.

Figure 13:
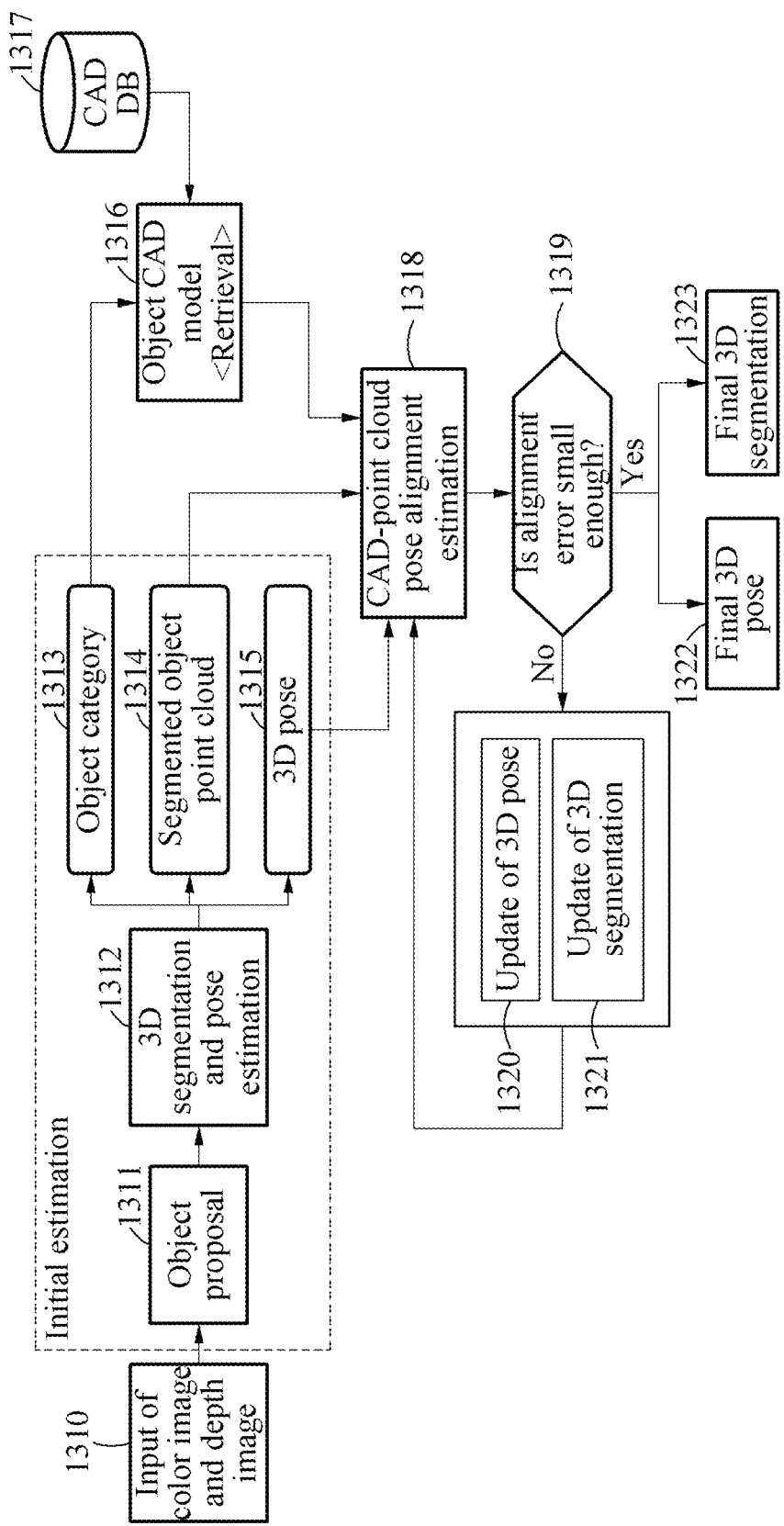
FIG. 13 illustrates an example of a method of refining a 3D detection result.

FIG. 13 illustrates an example of a method of refining a 3D detection result.

Referring to FIG. 13, a color image and a depth image are input in operation 1310.

In operation 1311, an object extraction result is determined based on a scheme of determining an extraction result of an object in the above-described image. The object extraction result may include an object extraction result extracted from the depth image, and an object extraction result extracted from the color image.

In operation 1312, an image processing method determines 3D segmentation and pose estimation corresponding to an initial 3D detection result based on the object extraction result.

The image processing method may determine an object category 1313 of the object in the image and point cloud data (for example, a segmented object point cloud 1314) corresponding to the object based on an initial 3D segmentation result, and may determine a 3D pose of the object based on an initial 3D pose result.

The image processing method may retrieve an original image corresponding to the object category 1313 based on the object category 1313 from a CAD database (DB) 1317 in operation 1316.

Also, the image processing method may perform a pose transformation on an original image based on a 3D pose 1315 so that a pose of an object of the original image may be matched to the 3D pose 1315, and may acquire a transformed image.

The image processing method may perform CAD-point cloud pose alignment estimation with respect to 3D point cloud data of the transformed image and 3D point cloud data of an object corresponding to a 3D segmentation result in operation 1318, and may obtain an alignment error (for example, difference information).

In an example, a setting condition may be set as a threshold, and difference information satisfying the set condition may indicate that the alignment error is less than the threshold. Difference information that does not satisfy the set condition may indicate that the alignment error is not less than the threshold.

In operation 1319, the image processing method compares the alignment error to a set threshold. In an example, when the alignment error is less than the set threshold, the initial 3D detection result may not need to be updated because the alignment error is sufficiently small. The initial 3D detection result may be a final 3D detection result, and may include a final 3D pose result 1322 and a final 3D segmentation result 1323. In another example, when the alignment error is not less than the set threshold, the initial 3D detection result may need to be updated because the alignment error is not sufficiently small. In an example, when the alignment error is an error corresponding to an error point and a missing point, the initial 3D segmentation result may be updated in operation 1321. In this example, when an alignment error corresponding to the updated 3D segmentation result is less than the set threshold, the 3D segmentation result may be used as the final 3D segmentation result 1323. In another example, when the alignment error is a pose error, the initial 3D pose result may be updated in operation 1320. In this example, when an alignment error corresponding to the updated 3D pose result is less than the set threshold, the 3D pose result may be used as the final 3D pose result 1322.

The image processing method may also determine difference information corresponding to an initial 3D detection result of each object using two MLP networks.

Figure 14:
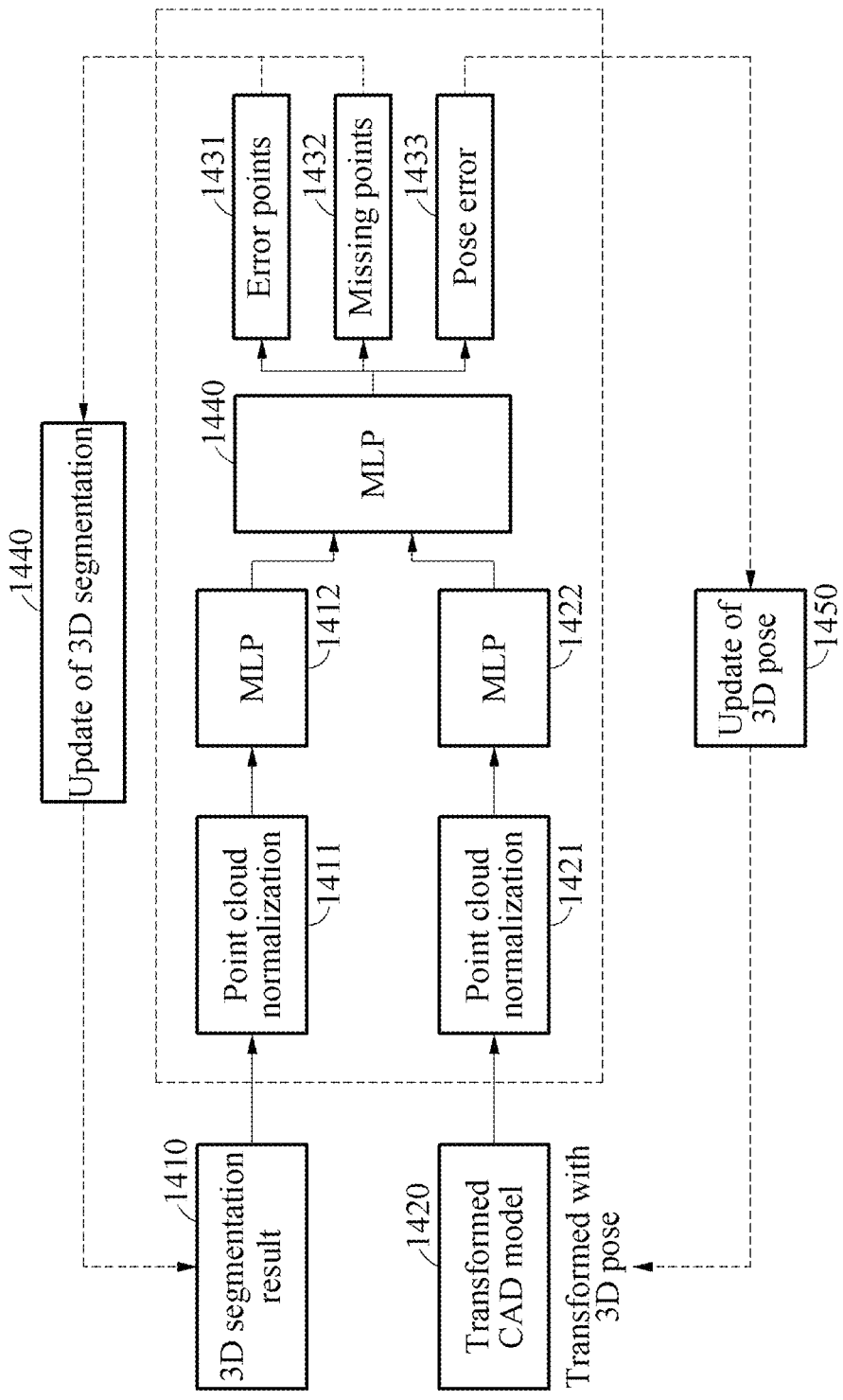
FIG. 14 illustrates another example of a method of refining a 3D detection result.

FIG. 14 illustrates another example of a method of refining a 3D detection result.

Referring to FIG. 14, an initial 3D detection result 1410 may include an initial 3D segmentation result and an initial 3D pose result. An image processing method may perform point cloud normalization on 3D point cloud data corresponding to an initial 3D segmentation result 1410 in operation 1411, and may acquire first features by extracting features from normalized 3D point cloud data using an MLP encoder 1412. An original image corresponding to an object may be determined in a CAD model. The image processing method may transform a pose of the original image based on the initial 3D pose result (for example, the 3D pose 1315 of FIG. 13) to obtain a transformed image 1420. The image processing method may perform point cloud normalization on 3D point cloud data corresponding to an object in the transformed image 1420 in operation 1421, and may acquire second features by extracting features from normalized 3D point cloud data using an MLP encoder 1422.

The image processing method may determine difference information corresponding to an initial 3D detection result of an object among the first features based on the first features and the second features, using an MLP encoder 1430. The difference information may include error points 1431 and missing points 1432 that correspond to the initial 3D segmentation result, and a pose error 1433 corresponding to the initial 3D pose result. Finally, the image processing method may update the initial 3D segmentation result based on the error points 1431 and missing points 1432 in operation 1440. Also, the image processing method may update the initial 3D pose result based on the pose error 1433 in operation 1450. When difference information corresponding to an updated 3D detection result of each object satisfies a set condition, the image processing method may stop updating and may acquire a final 3D detection result.

Figure 15:
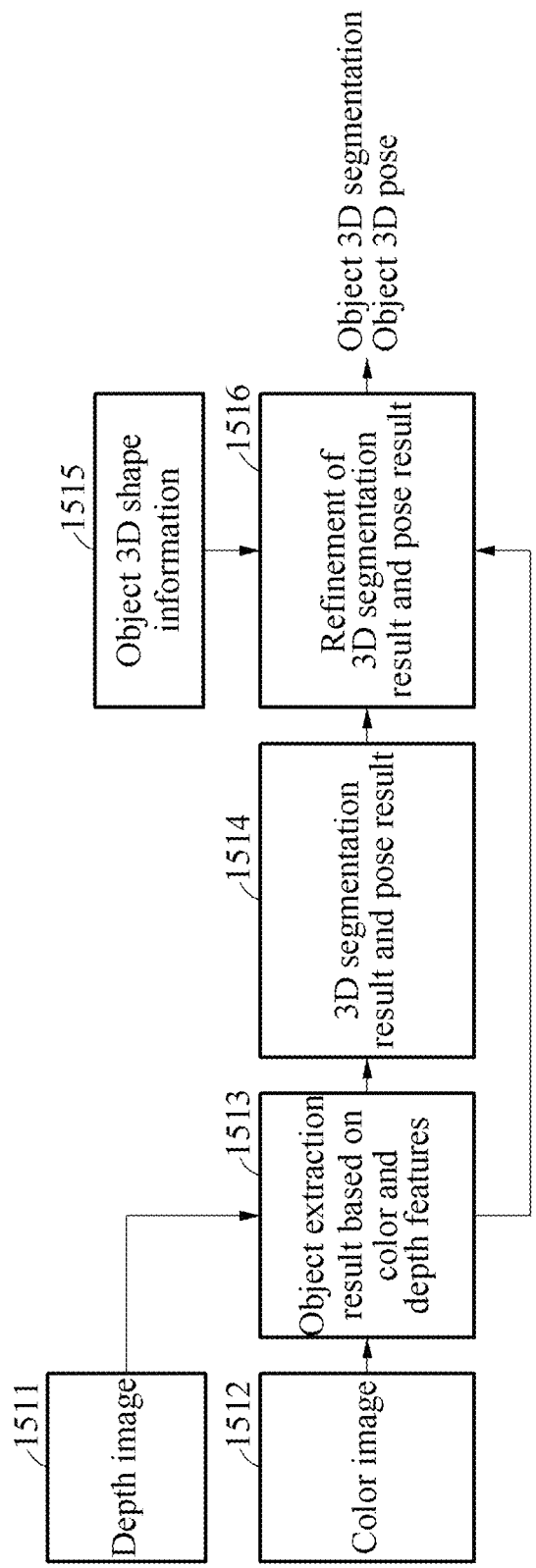
FIG. 15 illustrates an example of a method of determining a 3D detection result of an object based on a color image and a depth image.

FIG. 15 illustrates an example of a method of determining a 3D detection result of an object based on a color image and a depth image.

Referring to FIG. 15, an image processing method determines an object extraction result of an object included in an image based on a depth image 1511 and a color image 1512, in operation 1513. In operation 1514, the image processing method determines a 3D detection result of the object including a 3D segmentation result and a 3D pose result based on the object extraction result.

In operation 1516, the image processing method refines the 3D segmentation result and the 3D pose result corresponding to an original image (for example, object 3D shape information 1515) corresponding to the object based on the 3D detection result.

The image processing method may acquire an object 3D segmentation and an object 3D pose as a refined 3D detection result.

Figure 16:
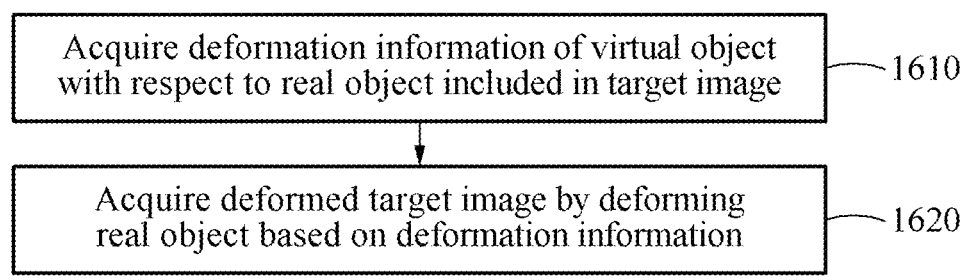
FIG. 16 is a diagram illustrating an example of an image processing method to deform an object.

FIG. 16 is a diagram illustrating an example of an image processing method to deform an object.

Referring to FIG. 16, in operation 1610, the image processing method acquires deformation information of a virtual object with respect to a real object included in a target image. In an example, the real object may be an object to be deformed and may also be referred to as a "target object".

In operation 1620, the image processing method acquires a deformed target image by deforming the real object based on the deformation information. The image processing method may deform the real object included in the target image based on the deformation information, so that the virtual object and the real object interact.

In an example, acquiring of the deformed target image by deforming the real object based on the deformation information may include determining an original image corresponding to the real object, determining a transformation relationship between an image (hereinafter, referred to as an "undeformed image") before deformation and an image (hereinafter, referred to as a "deformed image") after deformation based on a 3D pose result corresponding to the real object, the deformation information, and the original image corresponding to the real object, determining the deformed image based on the transformation relationship and the undeformed image, and determining the deformed target image based on the deformed image. The undeformed image and the deformed image may correspond to the real object. The undeformed image may be an image corresponding to the real object included in the targe image.

The real object, that is, the target object may be a deformable object, such as a bed or a sofa. A deformation request may be a request for deformation of the real object, and may be triggered by a user through an identifier designated in a user interface. For example, in the image processing method, when the target image includes a virtual object, the virtual object may be a virtual object realized by an AR technology, and a deformation request may be triggered based on motion information of the virtual object with respect to the real object that is deformed. In this example, the image processing method may determine the deformation information based on the motion information. The deformation information may include a deformation direction and deformation displacement of the object.

Deformation information in each deformation request may be the same or different. The deformation information may be configured in advance. For example, deformation information corresponding to objects in different object categories may be different based on an object category of the target object.

In the image processing method, the transformation relationship may be determined based on the deformation information first to deform the target object based on the deformation information. The transformation relationship may represent a corresponding relationship between the undeformed image and the deformed image. In other words, an image corresponding to the target object in the target image may be an undeformed image, and an image obtained by deforming the target object based on the deformation information may be a deformed image.

The image processing method may obtain the deformed image based on the undeformed image based on the transformation relationship. The target object may have a corresponding pose (for example, a pose corresponding to the 3D pose result) in the target image. Thus, the image processing method may more accurately determine the transformation relationship by combining 3D pose results of the target object.

The target image may be the target image of the image processing method of FIG. 1, and the 3D pose result may also be a 3D pose result that is based on the above-described method.

In an example, the real object, i.e., the target object may be determined based on a 3D segmentation result of the target image.

In an example, each object of the target image may have a corresponding 3D segmentation result, and the target object may be an arbitrary object included in the target image. The image processing method may distinguish objects included in the target image based on 3D segmentation results, and may accurately determine the target object included in the target image based on the 3D segmentation results. Since the target image includes a depth image and a color image, an image corresponding to the target object in the target image may be a color image or a depth image.

In an example, a 3D detection result may include a 3D segmentation result. Also, determining of an original image corresponding to the target object may include determining an object category of the target object based on the 3D segmentation result of the target object, and determining the original image corresponding to the target object based on the object category of the target object. Here, objects belonging to different physical categories may correspond to different original images, and an original image corresponding to an object may be more accurately determined based on an object category.

In an example, determining of the transformation relationship between the undeformed image and the deformed image based on the 3D pose result corresponding to the target object, the deformation information and the original image corresponding to the target object may include determining a deformation point after deformation corresponding to the target object in the original image based on the original image corresponding to the real object, the deformation information and the corresponding relationship, and determining the transformation relationship between the undeformed image and the deformed image based on the deformation point after deformation corresponding to the real object, a deformation point before deformation corresponding to the real object, and the 3D pose result corresponding to the target object. The corresponding relationship may be established based on deformation points corresponding to an object before and after deformation under different pieces of deformation information in a sample image.

Also, the corresponding relationship may be established in advance based on the sample image, an object of the sample image may also be a deformable object, and the sample image may be an original image. For objects of the original image, a corresponding relationship between deformation points of different objects before and after deformation based on different pieces of deformation information. The image processing method may determine deformation points before and after deformation of the target object under different pieces of deformation information based on the corresponding relationship. The image processing method may determine the transformation relationship by combining 3D pose results corresponding to the target object and the deformation point before the deformation of the target object, when the deformation point after the deformation corresponding to the target object in the original image is determined.

As an optional method for an image processing method, when the deformation point after the deformation corresponding to the target object of the original image is determined, before the transformation relationship is determined, 3D data may be converted into 2D data, and the transformation relationship may be obtained based on the 2D data. The 3D data may be converted into the 2D data based on a projection relationship between the 3D data and the 2D data.

In an example, determining of the transformation relationship between the undeformed image and the deformed image may include determining a weight of each deformation point corresponding to the target object, and determining the transformation relationship between the undeformed image and the deformed image based on the weight of each deformation point, the deformation point after deformation corresponding to the target object, the deformation point before deformation corresponding to the target object, and the 3D pose result corresponding to the target object.

A deformation effect of the target object may correspond to a deformation effect of each deformation point corresponding to the target object. For the deformation effect of each deformation point, each deformation point of the target object may correspond to a deformation effect of a different deformation intensity due to an object (for example, a virtual object) to which a force is applied or a stress point of the target object in an actual application. For example, a deformation intensity corresponding to a stress point of an object may be greater than a deformation intensity corresponding to a point adjacent to the stress point, and accordingly a deformation effect of an object may be more realistically achieved.

To allow the deformation effect of the target object to be more realistic, a weight of each deformation point corresponding to the target object may be determined before the target object is deformed. A value of a weight may indicate a deformation intensity of a deformation point, and an increase in the weight may indicate an increase in the deformation intensity. Thus, it is possible to obtain a more realistic deformation effect based on different weights corresponding to each deformation point, when the target object is deformed.

In an example, determining of the deformed target image based on the deformed image corresponding to the target object may include a mode or one of a first scheme of determining the deformed target image by replacing the undeformed image included in the target image with the deformed image corresponding to the target object, and a second scheme of determining a differential image based on the undeformed image and the deformed image corresponding to the target object, and determining the deformed target image based on the differential image.

The first scheme may be an image replacement scheme to replace the undeformed image with the deformed image. In other words, an object before deformation included in an image may be replaced with an object after deformation.

The second scheme may be an image fusion scheme to determine the differential image based on the undeformed image and the deformed image. The differential image may reflect corresponding changes in the target image before and after deformation. The deformed target image may be directly acquired by processing the target image based on the differential image.

In an example, when the target image is an image in a video, a frame image related to a target object in the video may be processed in the same manner based on a scheme of processing the target object in the target image, so that the target object in the frame image may also have a corresponding deformation effect. Based on the above-described processing, a deformation effect of the target object in the video may be obtained.

In an example, acquiring of a deformation request for a target object in the target image when the target image is an image in a video may include determining deformation information and an image corresponding to motion information based on motion information of a virtual object in the video with respect to the target object, and generating a deformation request for the image corresponding to motion information based on the deformation information and the image corresponding to motion information.

The image corresponding to motion information may include a plurality of consecutive frames in the video, and the motion information may be information about a motion direction or a motion intensity of the virtual object. The image processing method may determine deformation information of the target object based on the motion information of the virtual object. When a volume of the virtual object increases, a corresponding motion intensity may also increase. When a distance between the virtual object and the target object increases, a corresponding motion intensity may also increase. When the motion intensity increases, a corresponding deformation intensity may also increase.

To better understand the above-described image processing method, an example of a predetermined application scene will be described in detail.

Figure 17:
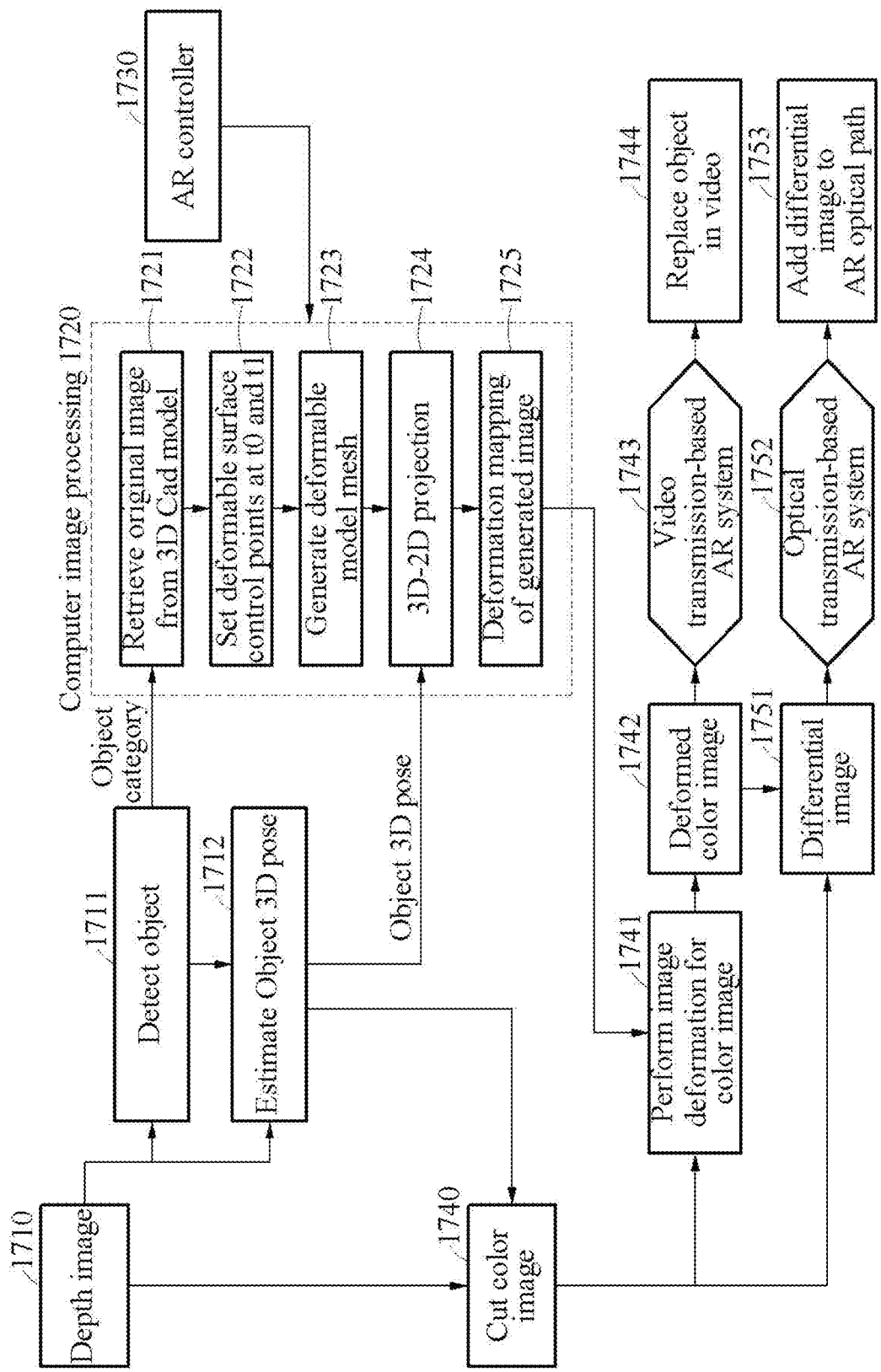
FIG. 17 illustrates an example of a method of deforming a target object included in a target image by a virtual object.

FIG. 17 illustrates an example of a method of deforming a target object included in a target image by a virtual object.

Referring to FIG. 17, the target image may include a color image and a depth image 1710. An object is detected from the depth image 1710 in the target image in operation 1711, a 3D segmentation result is obtained, and an object 3D pose is estimated in operation 1712 based on the above-described method.

A user may trigger a deformation request of the target object included in the target image using an AR controller 1730. For example, the user may trigger the deformation request based on the virtual object in a scene corresponding to the target image. The deformation request may include deformation information.

An image processing method may determine an object category of the target object based on the object detected in operation 1711 that is a 3D segmentation result of the target object.

In operation 1721, the image processing method retrieves an original image corresponding to the target object from a 3D CAD model based on the object category of the target object.

In operation 1722, the image processing method determines a deformation point after deformation of the target object in the original image based on deformation information, the original image corresponding to the target object and a corresponding relationship. The corresponding relationship may be established based on deformation points corresponding to an object before and after deformation under different pieces of deformation information in a sample image. Deformable surface control points at t0 and t1 may be a deformation point before deformation and a deformation point after deformation, respectively, and the corresponding relationship, which corresponds to a deformable model mesh generated in operation 1723, may be established based on the deformation points before and after deformation.

The image processing method may deform a pose of the deformation point after the deformation of the target object in the original image based on the 3D pose result of the target object, after the deformation, so that a pose of the target object in the original image after the deformation and a pose corresponding to the 3D pose result may be the same.

In the image processing method, the original image may be a 3D image, and the 3D pose result may be 3D data. Accordingly, the 3D data and the 3D image may be converted into 2D data based on a projection relationship between the 3D data and the 2D data in operation 1724.

In operation 1725, the image processing method determines a deformation relationship between a deformed image and an undeformed image corresponding to the target object based on the deformation points before and after the deformation of the target object in the original image after pose transformation.

The image processing method may determine the deformed image of the target object based on the undeformed image of the target object based on the deformation relationship. The image processing method may cut an image corresponding to the target object from the color image based on the target object in the target image in operation 1740, and may deform the image corresponding to the target object based on the established deformation relationship in operation 1741 to acquire a deformed color image 1742.

Two schemes of determining a deformed target image based on the deformed image corresponding to the target object in the image processing method are described below.

In a first scheme, a target object before deformation in the target image may be replaced with an object after deformation based on a principle of video transmission applied to a video transmission-based AR system 1743, which corresponds to operation 1744 of replacing an object in a video. The target image may be an image in a video.

In a second scheme, a differential image between a deformed image and an undeformed image (for example, an image corresponding to a target object in the color image) is determined based on the deformed image and the undeformed image in operation 1751. Also, based on an optical transmission-based AR system 1752, the deformed target image may be determined based on the differential image. The differential image is added to an AR optical path in operation 1753, so that the target object included in the target image may have a deformation effect.

Figure 18:
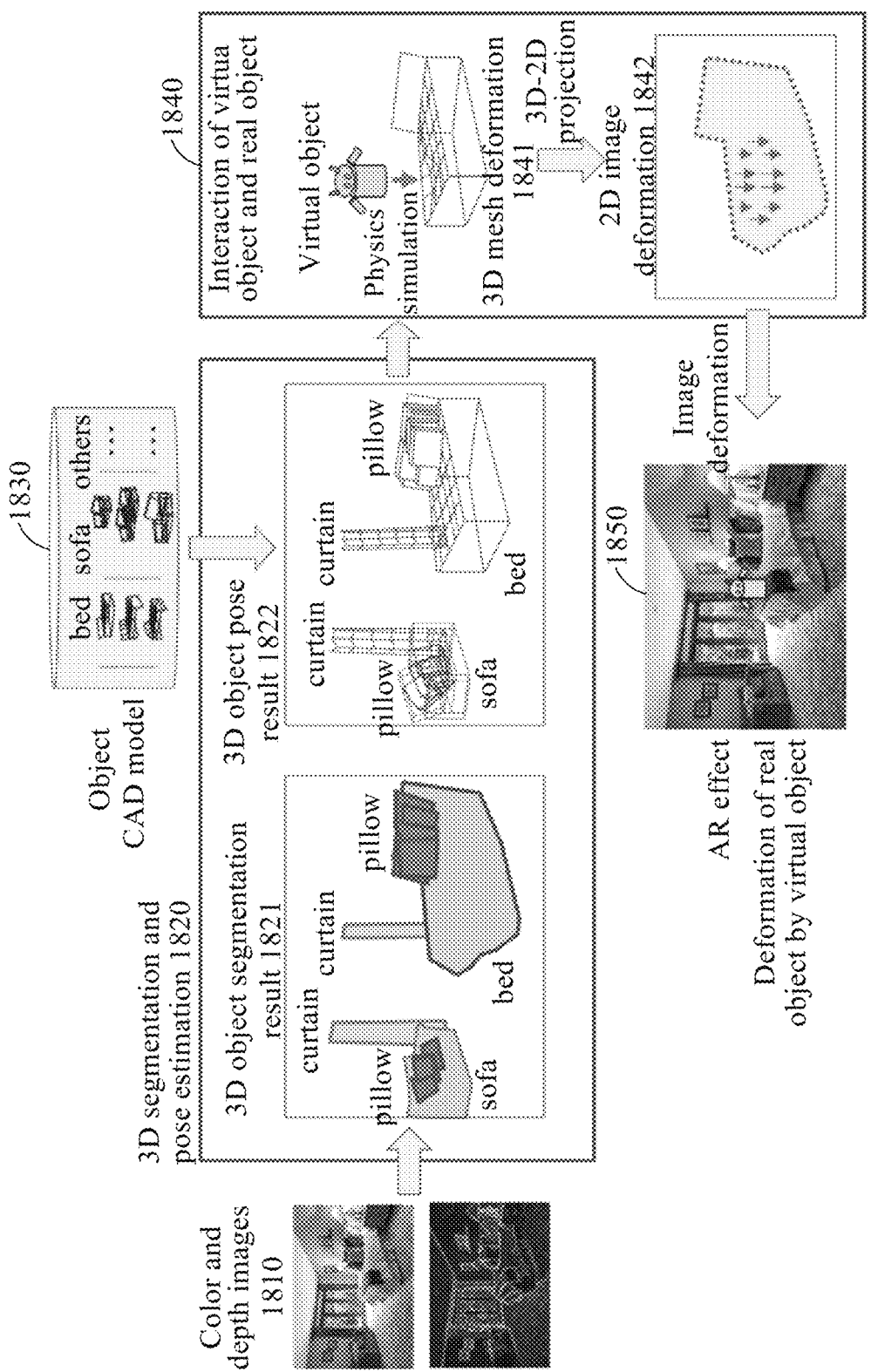
FIG. 18 illustrates an example of deforming a target object included in a target image by a virtual object.

FIG. 18 illustrates an example of deforming a target object included in a target image by a virtual object.

Referring to FIG. 18, a scene corresponding to a color image and a depth image of a target image 1810 shows a bedroom, and an object of the bedroom includes, for example, a bed, a sofa, pillows and curtains. The bed, the sofa, the pillows and the curtains may be deformable objects, and may be used as target objects.

A 3D detection result of each object included in the target image 1810 may be determined through 3D segmentation and pose estimation 1820 based on the depth image and the color image. The 3D detection result may include a 3D object segmentation result 1821 and a 3D object pose result 1822.

As shown in the 3D object segmentation result 1821 of FIG. 18, a bed, a sofa, pillows and curtains included in the image 1810 may all have corresponding segmentation results. As show in the 3D object pose result 1822, the bed, the sofa, the pillows and the curtains in the image 1810 may all have corresponding pose results. The target object may have deformable surface control points, i.e., deformation points at which a surface of an object may be deformed. For example, in an example of a segmentation result, a mesh corresponding to each target object may be a surface deformable deformation point, and a surface deformable deformation point of the bed may be, for example, a mesh on a top surface of the bed.

When the virtual object interacts with the bed in the target image in operation 1840, an original image corresponding to the bed may be determined from an object CAD model 1830 based on a 3D segmentation result of the bed. The object CAD model 1830 may include original images corresponding to different object categories, as shown in FIG. 18.

The image processing method deforms an image corresponding to the bed by the above-described scheme based on deformation information of the virtual object for the bed and the original image corresponding to the bed in operation 1841. For example, deformation processing of a 3D mesh corresponding to the bed may be performed, and deformation points after deformation of the bed in the original image may be obtained.

The deformation points after the deformation of the bed may be 3D data, and accordingly the image processing method may convert 3D data after the deformation of the bed into 2D data through 3D-2D projection in operation 1842. In other words, after deformation, a pose transformation may be performed with respect to the deformation points after the deformation of the bed in the original image based on a 3D pose result of the bed, so that a pose of the bed in the original image after the deformation and a pose of the bed in the 3D pose result may be the same.

Based on deformation points before and after the deformation of the bed in the original image after the pose transformation, a transformation relationship between the undeformed image and the deformed image corresponding to the bed may be determined. An 2D image (for example, the image corresponding to the bed in the target image) may be deformed based on the transformation relationship, the deformed image corresponding to the bed may be acquired, and a deformed target image may be determined based on the deformed image corresponding to the bed in operation 1850. As an AR effect, an interaction between the virtual object and the target object in the target image may be realized by deforming the bed in the image using the virtual object.

Similarly, other deformable objects, for example, the sofa or the curtains of the scene, may be processed based on the above scheme of FIG. 18.

Figure 19A:
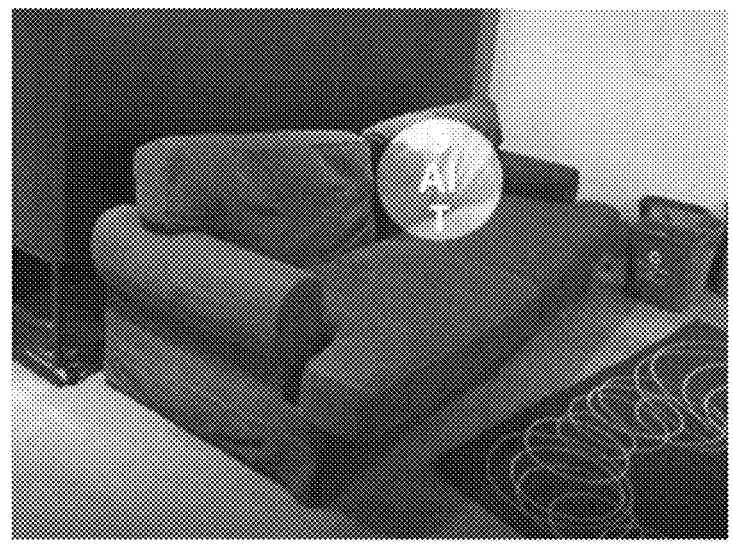
FIG. 19A illustrates an example of an image to which an effect of deforming a sofa included in a target image by a virtual object is not applied.

FIG. 19A illustrates an example of an image to which an effect of deforming a sofa included in a target image by a virtual object is not applied.

Figure 19B:
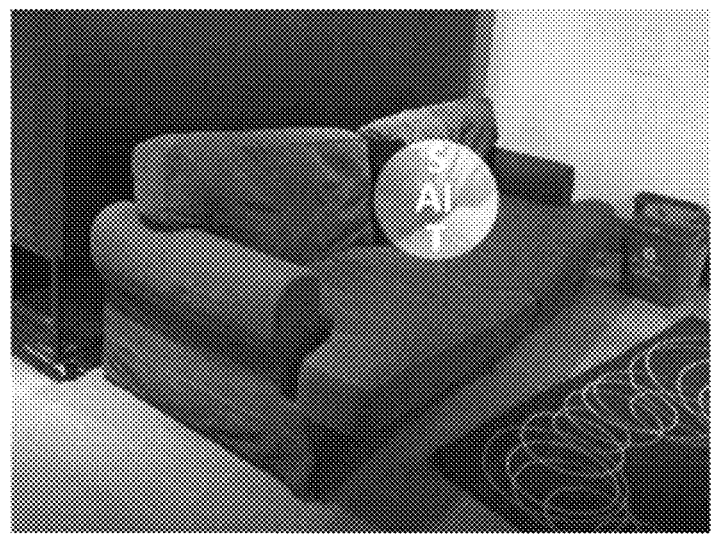
FIG. 19B illustrates an example of an image to which an effect of deforming a sofa included in a target image by a virtual object is applied.

FIG. 19B illustrates an example of an image to which an effect of deforming a sofa included in a target image by a virtual object is applied.

Referring to FIGS. 19A and 19B, circles with "SAIT" are virtual objects. In FIG. 19A, a surface of a sofa is flat and is not deformed, which may indicate that the virtual object does not interact with the sofa. In FIG. 19B, a surface of a sofa is deformed to become concave, which may indicate that the virtual object interacts with the sofa.

It may be understood that, although the operations of the flowcharts in FIGS. 1 to 3, 5 to 10, and 13 to 18 are displayed sequentially according to arrows, the operations are not necessarily performed according to an order indicated by the arrows. Unless explicitly specified in the present disclosure, the operations may be performed in other sequences. In addition, at least some operations in FIGS. 1 to 3, 5 to 10, and 13 to 18 may include a plurality of suboperations or a plurality of steps. The suboperations or the steps are not necessarily performed at a same moment, and instead may be performed at different moments. A performing sequence of the suboperations or the steps is not necessarily as indicated by the arrows, but may be performed in turn or alternately with another operation or at least some of suboperations or steps of the other operation.

Examples of the present disclosure further provide an image processing apparatus 2000 based on the same principle as that of FIG. 1.

Figure 20:
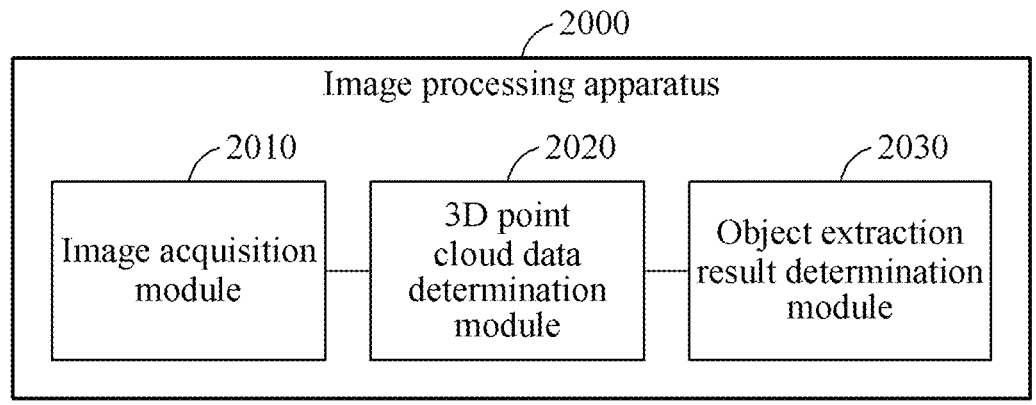
FIG. 20 illustrates an example of a structure of an image processing apparatus.

FIG. 20 illustrates an example of a structure of the image processing apparatus 2000.

Referring to FIG. 20, the image processing apparatus 2000 may include an image acquisition module 2010, a 3D point cloud data determination module 2020, and an object extraction result determination module 2030.

The image acquisition module 2010 may be used to acquire a target image that includes a depth image of a scene.

The 3D point cloud data determination module 2020 may be used to determine 3D point cloud data corresponding to the depth image based on the depth image.

The object extraction result determination module 2030 may be used to acquire an object extraction result of an object included in the scene based on the 3D point cloud data.

Since the object extraction result is acquired based on the 3D point cloud data and the 3D point cloud data indicates a point set of a plurality of 3D discrete points, a quantity of the 3D point cloud data may be less than a quantity of data corresponding to a 3D voxel. Thus, it is possible to save a storage space to reduce a data workload and to enhance a work efficiency of an algorithm.

For example, when acquiring the object extraction result based on the 3D point cloud data, the object extraction result determination module 2030 may convert the 3D point cloud data into a matrix based on the 3D point cloud data, may determine a first feature map based on the matrix, and may acquire the object extraction result based on the first feature map.

For example, when determining a matrix corresponding to the 3D point cloud data based on the 3D point cloud data, the object extraction result determination module 2030 may determine point cloud data belonging to the object in the 3D point cloud data and may determine the matrix corresponding to the 3D point cloud data based on the point cloud data belonging to the object in the 3D point cloud data.

The target image may further include a color image of the scene, and the image processing apparatus 2000 may further include a feature extraction module used to extract a feature from the color image and to acquire a second feature map.

Also, when acquiring the object extraction result based on the first feature map, the object extraction result determination module 2030 may acquire the object extraction result based on the first feature map and the second feature map.

For example, when acquiring the object extraction result based on the first feature map and the second feature map, the object extraction result determination module 2030 may acquire a third feature map corresponding to the target image by fusing the first feature map and the second feature map, and may acquire the object extraction result based on the third feature map.

For example, when acquiring the object extraction result based on the third feature map, the object extraction result determination module 2030 may acquire at least two sub-images by cutting the target image, may determine object extraction results for each of the sub-images based on a third feature map corresponding to each of the sub-images and/or a third feature map corresponding to a sub-image adjacent to each of the sub-images, and may acquire the object extraction result by fusing the determined object extraction results.

When determining the object extraction results for each of the sub-images based on the third feature map corresponding to each of the sub-images and/or the third feature map corresponding to the sub-image adjacent to each of the sub-images, the object extraction result determination module 2030 may determine a weight of each of the sub-images, and may determine the object extraction results for each of the sub-images based on the third feature map corresponding to each of the sub-images and/or the third feature map corresponding to the sub-image adjacent to each of the sub-images, and the weight of each of the sub-images.

The object extraction result determination module 2030 may determine a weight of each of the sub-images using one of a scheme of determining the weight of each of the sub-images based on a sub-feature map corresponding to each of the sub-images, and a scheme of determining a candidate point of the target image and determining the weight of each of the sub-images based on a candidate point of each of the sub-images or a sub-feature map corresponding to the candidate point of each of the sub-images.

For example, when determining the weight of each of the sub-images based on the candidate point of each of the sub-images, the object extraction result determination module 2030 may determine a similarity relationship between the candidate point of each of the sub-images and a candidate point of a sub-image adjacent to each of the sub-images, and may determine the weight of each of the sub-images based on the similarity relationship.

For example, when determining the weight of each of the sub-images based on the sub-feature map corresponding to each of the sub-images, the object extraction result determination module 2030 may use one of schemes described below to determine the weight of each of the sub-images.

In a first scheme, a first feature vector corresponding to a central position of each of the sub-images and a second feature vector corresponding to a sub-feature map corresponding to each of the sub-images may be determined, and the weight of each of the sub-images may be determined based on the first feature vector and the second feature vector corresponding to each of the sub-images.

In a second scheme, the sub-feature map corresponding to each of the sub-images may correspond to at least one probability value, each probability value may represent a probability of the sub-feature map belonging to a corresponding object, and a maximum probability value among the at least one probability value may be used as a weight for each of the sub-images.

The image processing apparatus 2000 may further include a 3D detection result determination module used to determine a 3D detection result of the object included in the target image based on the object extraction result. The 3D detection result may include either one or both of a 3D pose result and a 3D segmentation result.

When determining the 3D detection result of the object in the target image based on the object extraction result, the 3D detection result determination module may extract a 2D image feature and a 3D point cloud feature corresponding to the object extraction result, may acquire a fourth feature map by splicing the 2D image feature and the 3D point cloud feature, and may determine the 3D detection result of the object included in the target image based on the fourth feature map.

When determining the 3D detection result of the object in the target image based on the object extraction result, the 3D detection result determination module may determine an initial 3D detection result of the object included in the target image based on the object extraction result, may determine an original image corresponding to the object included in the target image, may determine difference information corresponding to an initial 3D detection result of each object based on the initial 3D detection result of each object and a corresponding original image, and may determine a 3D detection result of each object included in the target image, by updating an initial 3D detection result of a corresponding object based on the difference information.

The present disclosure may further provide an image processing apparatus 2100 based on the principle as illustrated with reference to FIG. 16.

Figure 21:
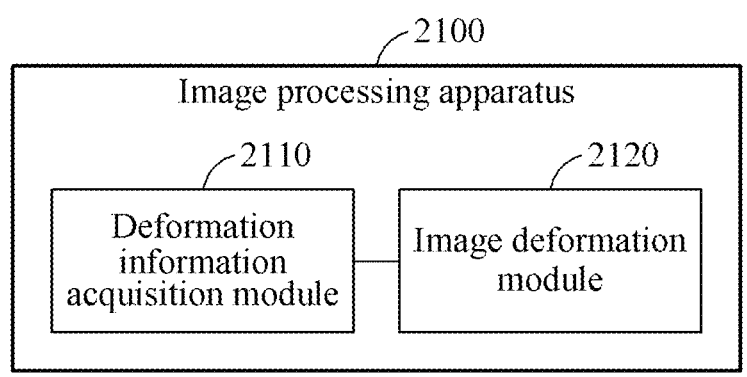
FIG. 21 illustrates an example of a structure of an image processing apparatus to deform an object.

FIG. 21 illustrates an example of a structure of the image processing apparatus 2100 to deform an object.

Referring to FIG. 21, the image processing apparatus 2100 may include a deformation information acquisition module 2110 and an image deformation module 2120.

The deformation information acquisition module 2110 may be used to acquire deformation information of a virtual object with respect to a real object included in a target image.

The image deformation module 2120 may be used to acquire the deformed target image by deforming the real object based on the deformation information.

For example, when acquiring the deformed target image by deforming the real object based on the deformation information, the image deformation module 2120 may determine an original image corresponding to the real object, may determine a transformation relationship between an undeformed image and a deformed image corresponding to the real object based on a 3D pose result corresponding to the real object, the deformation information, and the original image corresponding to the real object, may determine the deformed image corresponding to the real object based on the transformation relationship and the undeformed image corresponding to the real object, and may determine the deformed target image based on the deformed image corresponding to the real object. The undeformed image may be an image corresponding to the real object included in the target image.

When determining the transformation relationship between the undeformed image and the deformed image corresponding to the real object, i.e., a target object based on the 3D pose result corresponding to the target object, the deformation information, and the original image corresponding to the target object, the image deformation module 2120 may determine a deformation point after deformation corresponding to the target object in the original image based on the original image corresponding to the target object, the deformation information and a corresponding relationship, and may determine the transformation relationship between the undeformed image and the deformed image corresponding to the target object based on the deformation point after deformation corresponding to the target object, a deformation point before deformation corresponding to the target object, and the 3D pose result corresponding to the target object. The corresponding relationship may be established based on deformation points corresponding to an object before and after deformation under different pieces of deformation information in a sample image.

When determining the transformation relationship between the undeformed image and the deformed image corresponding to the target object based on the deformation point after deformation corresponding to the target object, the deformation point before deformation corresponding to the target object, and the 3D pose result corresponding to the target object, the image deformation module 2120 may determine a weight of each deformation point corresponding to the target object, and may determine the transformation relationship between the undeformed image and the deformed image corresponding to the target object based on the weight of each deformation point, the deformation point after deformation corresponding to the target object, the deformation point before deformation corresponding to the target object, and the 3D pose result corresponding to the target object.

When determining the deformed target image based on the deformed image corresponding to the target object, the image deformation module 2120 may use either one or both of the schemes described below.

In a first scheme of determining the deformed target image, the deformed target image may be acquired by replacing the undeformed image included in the target image with the deformed image corresponding to the target object.

In a second scheme of determining the deformed target image, a differential image may be determined based on the deformed image and the undeformed image that correspond to the target object, and the deformed target image may be determined based on the differential image.

Although the image processing apparatuses 2000 and 2100 are separately illustrated in FIGS. 20 and 21, the image processing apparatuses 2000 and 2100 may be implemented as a single apparatus.

The image processing apparatuses 2000 and 2100 according to an example may be apparatuses configured to perform the image processing method, and accordingly a specific implementation method and various modifications of the image processing apparatuses 2000 and 2100 according to examples of the present disclosure that may be apparent after an understanding of the disclosure of this application. Thus, a method of implementing the image processing method by the image processing apparatuses 2000 and 2100 is not described herein. To implement the image processing method according to the present disclosure, all image processing apparatuses adopted by one of ordinary skill in the art shall be used without departing from the sprit or scope of the illustrated examples described herein.

The present disclosure may further provide an electronic apparatus 2200 based on the same principle as those of the image processing method and the image processing apparatuses 2000 and 2100 according to the present disclosure. The electronic apparatus 2200 may include a processor and a memory. The memory may store a readable instruction. When the readable instruction is loaded and executed by the processor, a method according to the present disclosure may be implemented.

Figure 22:
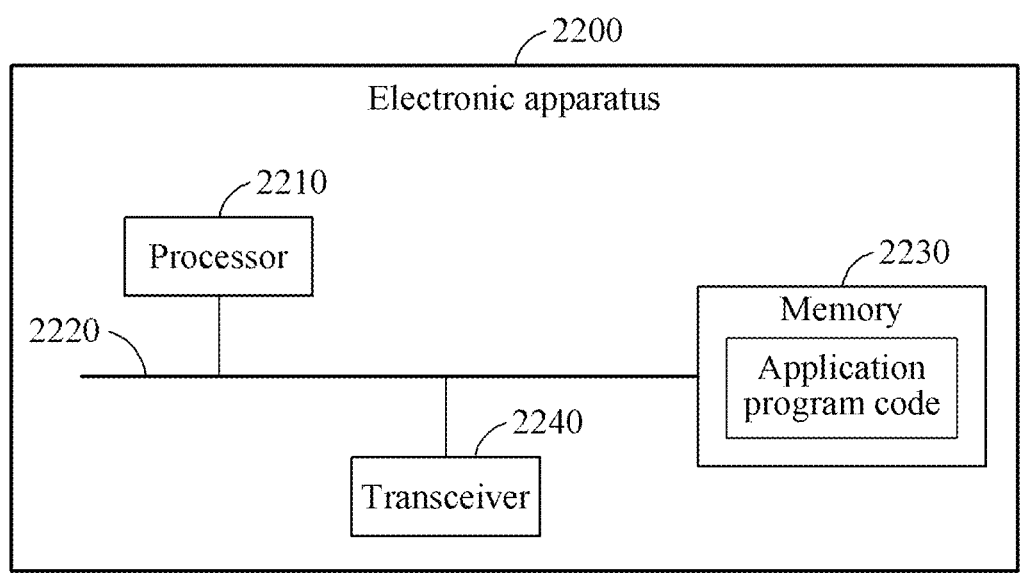
FIG. 22 illustrates an example of a structure of an electronic apparatus.

FIG. 22 illustrates an example of a structure of the electronic apparatus 2200.

An image processing method according to an example may be applicable to the structure of the electronic apparatus 2200. Referring to FIG. 22, the electronic apparatus 2200 includes a processor 2010 and a memory 2030. The processor 2210 may be connected to the memory 2230 through, for example, a bus 2220. Selectively, the electronic apparatus 2200 may further include a transceiver 2240. In actual applications, the transceiver 2240 is not limited to one transceiver, and examples are not limited to the structure of the electronic apparatus 2200.

The processor 2210 may be a central processing unit (CPU), a general processor, a digital signal processor (DSP), an application-specific integrated circuit (ASIC), a field programmable gate array (FPGA) or another programmable logic device, a transistor logic device, a hardware component, or any combination thereof. The processor 2210 may implement or execute various illustrative logical blocks, modules, and circuits that are described in connection with the examples described herein. The processor 2210 may be a combination for implementing a computing function, for example, a combination of one or more microprocessors or a combination of a DSP and a microprocessor. Further details regarding the processor 2210 are described below.

The bus 2220 may include a path to transmit information between the above-described components. The bus 2220 may be, for example, a peripheral component interconnect (PCI) bus, or an extended industry standard architecture (EISA) bus. The bus 2220 may be classified as an address bus, a data bus, or a control bus. For ease of indication, the bus 2220 is indicated using only one line in FIG. 22, which does not indicate, however, that there is only one bus or only one type of bus.

The memory 2230 may be a read-only memory (ROM) or another type of static storage device configured to store static information and an instruction, a random-access memory (RAM) or another type of dynamic storage device configured to store information and an instruction, or may be an electrically erasable programmable read-only memory (EEPROM), a compact disc read-only memory (CD-ROM) or another compact disc storage, an optical disc storage (for example, a compressed optical disc, a laser disc, an optical disc, a digital versatile optical disc, or a Blu-ray disc), a disk storage medium or another magnetic storage device, or other media that may be configured to carry or store desired program code in a form of am instruction or a data structure and that may be accessed by a computer, but is not limited thereto. Further details regarding the memory 2230 are described below.

The memory 2230 may be used to store application program code to perform the methods according to the present disclosure, and the application program code may be executed under a control of the processor 2210. The processor 2210 may execute the application program code stored in the memory 2230 to implement the above-described methods according to examples.

The examples of the image processing apparatus and method described above saves storage space and enhance an efficiency of an algorithm.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes any one or any combination of any two or more of an applet, a dynamic link library (DLL), middleware, firmware, a device driver, and an application program storing the image processing method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
   acquiring deformation information of a virtual object with respect to a real object included in a target image; and
   acquiring the deformed target image by deforming the real object based on the deformation information.

2. The image processing method of claim 1, wherein the acquiring of the deformed target image by deforming the real object based on the deformation information comprises:
   determining an original image corresponding to the real object;
   determining a transformation relationship between an undeformed image and a deformed image based on a three-dimensional (3D) pose result corresponding to the real object, the deformation information, and the original image corresponding to the real object, the undeformed image, and the deformed image corresponding to the real object;
   determining the deformed image based on the transformation relationship and the undeformed image; and
   determining the deformed target image based on the deformed image,
   wherein the undeformed image is an image corresponding to the real object included in the target image.

3. The image processing method of claim 2, wherein the determining of the transformation relationship between the undeformed image and the deformed image based on the 3D pose result corresponding to the real object, the deformation information, and the original image corresponding to the real object comprises:
   determining a deformation point after deformation corresponding to the real object in the original image based on the original image corresponding to the real object, the deformation information and a corresponding relationship; and
   determining the transformation relationship between the undeformed image and the deformed image corresponding to the real object based on the deformation point after deformation corresponding to the real object, a deformation point before deformation corresponding to the real object, and the 3D pose result corresponding to the real object, and
   the corresponding relationship is established based on deformation points corresponding to an object before and after deformation under different pieces of deformation information in a sample image.

4. The image processing method of claim 3, wherein the determining of the transformation relationship between the undeformed image and the deformed image corresponding to the real object based on the deformation point after deformation corresponding to the real object, the deformation point before deformation corresponding to the real object, and the 3D pose result corresponding to the real object comprises:
   determining a weight of each deformation point corresponding to the real object; and
   determining the transformation relationship between the undeformed image and the deformed image corresponding to the real object based on the weight of each deformation point, the deformation point after deformation corresponding to the real object, the deformation point before deformation corresponding to the real object, and the 3D pose result corresponding to the real object.

5. The image processing method of claim 2, wherein the determining of the deformed target image based on the deformed image corresponding to the real object comprises either one or both of:
   acquiring the deformed target image, by replacing the undeformed image with the deformed image; and
   determining a differential image based on the undeformed image and the deformed image, and determining the deformed target image based on the differential image.

* * * * *